(12) United States Patent
Puzio et al.

(10) Patent No.: US 7,690,658 B2
(45) Date of Patent: Apr. 6, 2010

(54) TOOL CHUCK WITH POWER TAKE OFF FEATURE

(75) Inventors: Daniel Puzio, Baltimore, MD (US); John R. Cochran, Baltimore, MD (US); John E. Buck, Cockeysville, MD (US)

(73) Assignee: Black & Decker Inc., Newark, DE (US)

( * ) Notice: Subject to any disclaimer, the term of this patent is extended or adjusted under 35 U.S.C. 154(b) by 265 days.

(21) Appl. No.: 11/227,200

(22) Filed: Sep. 16, 2005

(65) Prior Publication Data

US 2006/0061048 A1 Mar. 23, 2006

Related U.S. Application Data

(60) Provisional application No. 60/610,973, filed on Sep. 20, 2004.

(51) Int. Cl.
*B23B 31/26* (2006.01)
*B23B 31/169* (2006.01)

(52) U.S. Cl. ............... 279/60; 279/134; 279/902; 475/300

(58) Field of Classification Search ............... 279/60, 279/134, 902, 61, 62, 63, 124; 74/606 R; 475/298, 300; 464/162, 172
See application file for complete search history.

(56) References Cited

U.S. PATENT DOCUMENTS

| | | | | |
|---|---|---|---|---|
| 913,059 A | | 2/1909 | Savage | |
| 1,748,511 A | * | 2/1930 | Johnson | 279/60 |
| 1,750,023 A | * | 3/1930 | Prigan | 279/60 |
| 2,220,654 A | * | 11/1940 | Kirkland | 279/60 |
| 2,253,345 A | * | 8/1941 | Palmgren | 279/60 |
| 2,353,514 A | | 7/1944 | Slater | |
| 2,404,006 A | * | 7/1946 | Thomas | 279/60 |
| 2,544,088 A | * | 3/1951 | Hollis | 279/60 |
| 2,684,856 A | | 7/1954 | Stoner | |
| 2,716,555 A | * | 8/1955 | Rowe | 279/56 |
| 2,848,911 A | | 8/1958 | Black | |
| 2,931,660 A | | 4/1960 | Barwinkel | |
| 3,506,277 A | | 4/1970 | Harms | |
| 3,545,766 A | | 12/1970 | Osborn | |
| 3,647,231 A | * | 3/1972 | Schafer | 279/4.06 |

(Continued)

FOREIGN PATENT DOCUMENTS

DE 1985830 5/1968

(Continued)

OTHER PUBLICATIONS

International Search Report issued Dec. 18, 2006 in corresponding European Patent Application No. EP 06 11 2710.

(Continued)

*Primary Examiner*—Eric A Gates
(74) *Attorney, Agent, or Firm*—Capitol City TechLaw

(57) ABSTRACT

A tool chuck may include a shaft supporting chuck jaws. The shaft may provide a first transmission power path for rotationally driving the chuck jaws. The shaft may have a through hole. A chuck actuating mechanism may be provided in the through hole. The chuck actuating mechanism may provide a second transmission power path for opening and closing the chuck jaws.

22 Claims, 15 Drawing Sheets

U.S. PATENT DOCUMENTS

| | | | |
|---|---|---|---|
| 3,721,092 A * | 3/1973 | Schafer | 60/581 |
| 3,776,647 A | 12/1973 | Hart | |
| 3,970,323 A | 7/1976 | Schnizler, Jr. | |
| 4,085,337 A * | 4/1978 | Moeller | 307/115 |
| 4,094,523 A | 6/1978 | Derbyshire | |
| 4,260,169 A | 4/1981 | Hall | |
| 4,277,074 A | 7/1981 | Kilberis | |
| 4,302,021 A | 11/1981 | Röhm | |
| 4,317,578 A | 3/1982 | Welch | |
| 4,323,324 A | 4/1982 | Eberhardt | |
| 4,358,230 A | 11/1982 | Rohlin | |
| 4,395,170 A | 7/1983 | Clarey | |
| 4,493,407 A | 1/1985 | Newton | |
| 4,498,682 A | 2/1985 | Glore | |
| 4,526,497 A | 7/1985 | Hatfield | |
| 4,527,809 A | 7/1985 | Umbert | |
| 4,536,113 A | 8/1985 | Hatfield | |
| 4,557,703 A | 12/1985 | Rivin | |
| 4,605,345 A | 8/1986 | Giughese | |
| 4,628,918 A | 12/1986 | Johnson, Jr. | |
| 4,655,464 A | 4/1987 | Manschitz et al. | |
| 4,664,394 A | 5/1987 | Theissig et al. | |
| 4,669,930 A | 6/1987 | Stenmark | |
| 4,669,932 A | 6/1987 | Hartley | |
| 4,682,918 A * | 7/1987 | Palm | 408/241 R |
| 4,788,021 A | 11/1988 | Griffiths | |
| 4,802,798 A | 2/1989 | Adamson | |
| 4,824,298 A | 4/1989 | Lippacher et al. | |
| 4,840,387 A | 6/1989 | McCarthy | |
| 4,848,779 A | 7/1989 | Wheeler et al. | |
| 4,930,793 A | 6/1990 | Ando | |
| 4,951,955 A | 8/1990 | Sakamaki | |
| 4,955,623 A | 9/1990 | Röhm | |
| 4,958,840 A | 9/1990 | Palm | |
| 4,976,575 A | 12/1990 | Kappelhof et al. | |
| 4,998,589 A | 3/1991 | Wiesendanger | |
| 5,011,343 A | 4/1991 | Saban et al. | |
| 5,019,023 A * | 5/1991 | Kurosawa | 475/269 |
| 5,022,278 A | 6/1991 | DeCaussin | |
| 5,031,925 A | 7/1991 | Tatsu et al. | |
| 5,067,376 A | 11/1991 | Fossella | |
| 5,090,273 A | 2/1992 | Fossella | |
| 5,125,673 A | 6/1992 | Huff et al. | |
| 5,145,193 A | 9/1992 | Röhm | |
| 5,147,164 A | 9/1992 | Fraver | |
| 5,171,030 A | 12/1992 | Röhm | |
| 5,172,923 A | 12/1992 | Nakamura | |
| 5,174,588 A | 12/1992 | Reibetanz et al. | |
| 5,183,274 A | 2/1993 | Sakamaki | |
| 5,195,760 A | 3/1993 | Wheeler et al. | |
| 5,197,749 A | 3/1993 | Moore et al. | |
| 5,215,317 A | 6/1993 | Jordan et al. | |
| 5,232,230 A | 8/1993 | Lin | |
| 5,286,041 A | 2/1994 | Röhm | |
| 5,299,814 A | 4/1994 | Salpaka | |
| 5,322,303 A | 6/1994 | Nakamura | |
| 5,339,908 A | 8/1994 | Yokota et al. | |
| 5,340,248 A | 8/1994 | Enbergs | |
| 5,342,154 A | 8/1994 | Holzer | |
| 5,343,961 A | 9/1994 | Ichikawa | |
| 5,348,317 A | 9/1994 | Steadings et al. | |
| 5,348,318 A | 9/1994 | Steadings et al. | |
| 5,407,215 A | 4/1995 | Yang | |
| 5,419,663 A | 5/1995 | Psomas | |
| 5,431,420 A | 7/1995 | Huff et al. | |
| 5,435,578 A | 7/1995 | Röhm | |
| 5,448,931 A | 9/1995 | Fossella et al. | |
| 5,458,345 A | 10/1995 | Amyot | |
| 5,499,829 A | 3/1996 | Röhm | |
| 5,499,830 A | 3/1996 | Schnizler | |
| 5,531,549 A | 7/1996 | Fossella | |
| 5,553,873 A | 9/1996 | Salpaka et al. | |
| 5,573,358 A | 11/1996 | Gobbers et al. | |
| 5,624,125 A | 4/1997 | Röhm | |
| 5,685,549 A | 11/1997 | Yang | |
| 5,732,956 A | 3/1998 | Huff et al. | |
| 5,741,016 A | 4/1998 | Barton et al. | |
| 5,795,110 A | 8/1998 | Wirth et al. | |
| 5,820,134 A | 10/1998 | Subils Valls | |
| 5,908,076 A | 6/1999 | Marcengill et al. | |
| 5,918,685 A | 7/1999 | Ulbrich et al. | |
| 5,922,538 A | 7/1999 | Hazel et al. | |
| 5,951,026 A | 9/1999 | Harman, Jr. et al. | |
| 5,957,469 A | 9/1999 | Miles et al. | |
| 5,988,653 A | 11/1999 | Kuo | |
| 5,988,958 A | 11/1999 | Mack | |
| 5,992,859 A | 11/1999 | Lin | |
| 6,007,071 A | 12/1999 | Middleton | |
| 6,007,277 A | 12/1999 | Olson et al. | |
| 6,017,039 A | 1/2000 | Gaddis et al. | |
| 6,056,298 A | 5/2000 | Williams | |
| 6,079,716 A | 6/2000 | Harman, Jr. et al. | |
| 6,105,450 A | 8/2000 | Sasaki et al. | |
| 6,139,228 A | 10/2000 | Longo | |
| 6,173,972 B1 | 1/2001 | Temple-Wilson et al. | |
| 6,260,856 B1 | 7/2001 | Temple-Wilson | |
| 6,354,605 B1 | 3/2002 | Aultman | |
| 6,398,226 B1 | 6/2002 | Huggins et al. | |
| 6,431,289 B1 | 8/2002 | Potter | |
| 6,488,286 B2 | 12/2002 | Yaksich | |
| 6,488,287 B2 | 12/2002 | Gaddis et al. | |
| 6,506,002 B1 | 1/2003 | Cummins | |
| 6,517,295 B2 | 2/2003 | Lin | |
| 6,523,658 B2 | 2/2003 | Furuta et al. | |
| 6,648,563 B2 | 11/2003 | Rohm | |
| 6,729,812 B2 | 5/2004 | Yaksich et al. | |
| 6,733,393 B2 | 5/2004 | Rivin | |
| 6,736,410 B2 | 5/2004 | Barton et al. | |
| 6,832,764 B2 | 12/2004 | Steadings et al. | |
| 6,843,484 B2 | 1/2005 | Schroeder | |
| 7,021,400 B2 | 4/2006 | Oretti | |
| 7,073,606 B2 | 7/2006 | Mamber et al. | |
| 2001/0026051 A1 | 10/2001 | Gifford et al. | |
| 2003/0077137 A1 | 4/2003 | Rohm | |
| 2004/0146367 A1 | 7/2004 | Gerhardt et al. | |
| 2005/0013674 A1 | 1/2005 | Vidal | |
| 2006/0027978 A1 | 2/2006 | Young et al. | |
| 2006/0066063 A1 * | 3/2006 | Nickels et al. | 279/62 |

FOREIGN PATENT DOCUMENTS

| | | |
|---|---|---|
| DE | 2317779 | 10/1974 |
| DE | 7536582 | 5/1976 |
| DE | 7617128 | 12/1976 |
| DE | 2757140 | 6/1979 |
| DE | 8002633 | 7/1980 |
| DE | 3110458 | 10/1982 |
| DE | 3140776 | 4/1983 |
| DE | 8513848 | 8/1985 |
| DE | 9006555 | 9/1990 |
| DE | 9405628 | 7/1994 |
| DE | 3527234 | 2/1997 |
| DE | 29820433 | 3/1999 |
| DE | 29913083 | 10/1999 |
| DE | 10125186 | 12/2002 |
| DE | 202004003323 | 8/2004 |
| DE | 10359420 | 7/2005 |
| EP | 0448801 | 10/1991 |
| EP | 0515371 | 12/1992 |
| EP | 0620069 | 10/1994 |
| EP | 0716896 | 1/1995 |
| EP | 0674961 | 10/1995 |
| EP | 1101553 | 5/2001 |
| FR | 1602481 | 1/1971 |

| | | | |
|---|---|---|---|
| GB | 2041798 A * | 9/1980 | |
| WO | WO 00/35619 | 6/2000 | |
| WO | WO 02/058893 A1 | 8/2002 | |
| WO | WO 2005/025792 | 3/2005 | |
| WO | WO 2006/034287 A2 | 3/2006 | |

OTHER PUBLICATIONS

International Search Report and Written Opinion issued Feb. 26, 2007 in related PCT Application No. PCT/US05/33697.

* cited by examiner

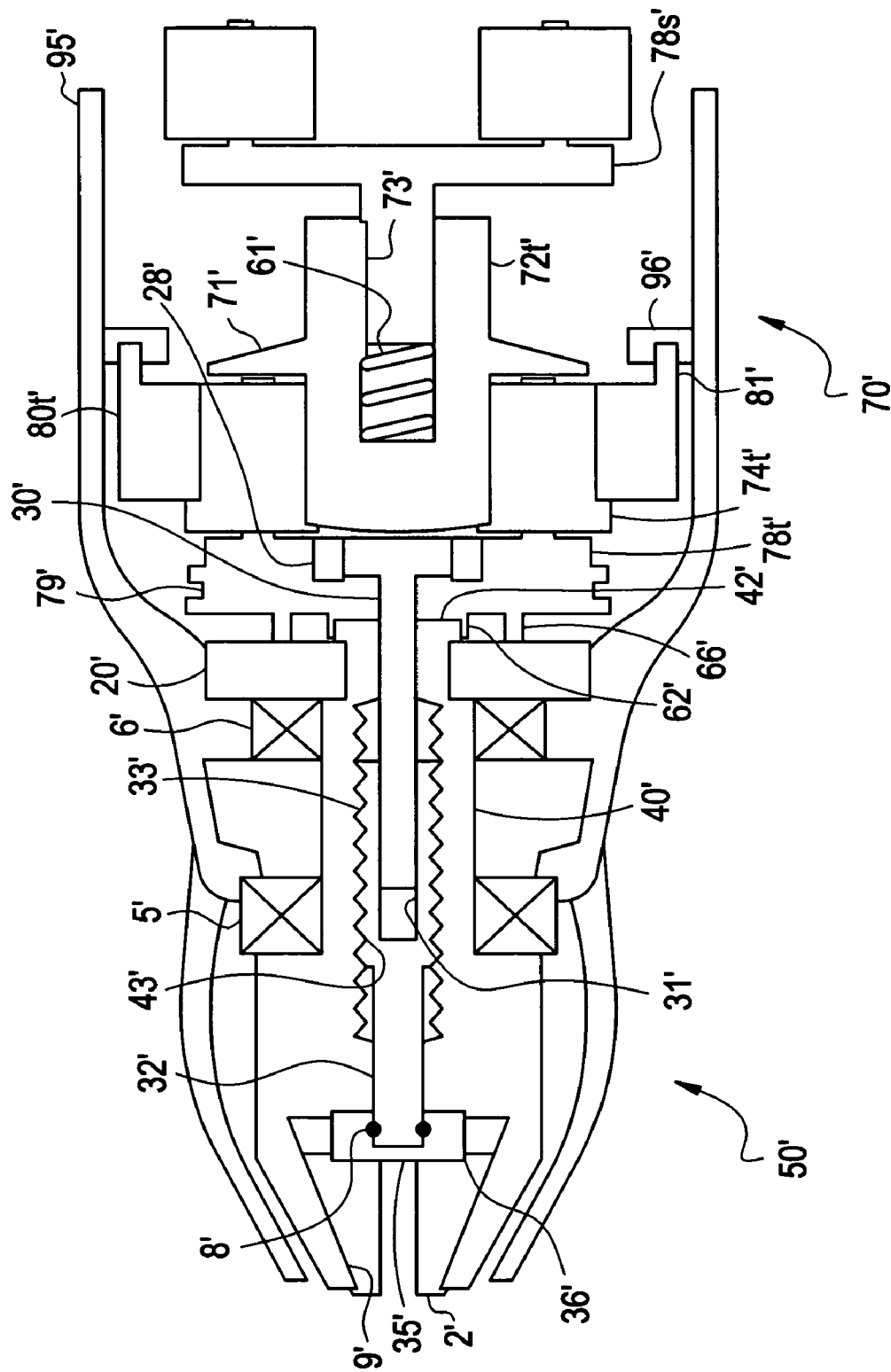

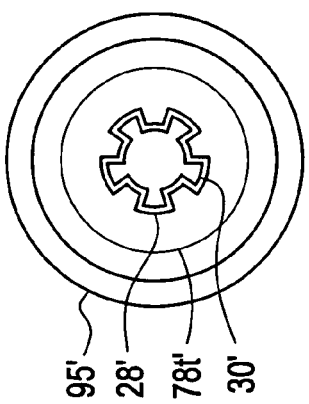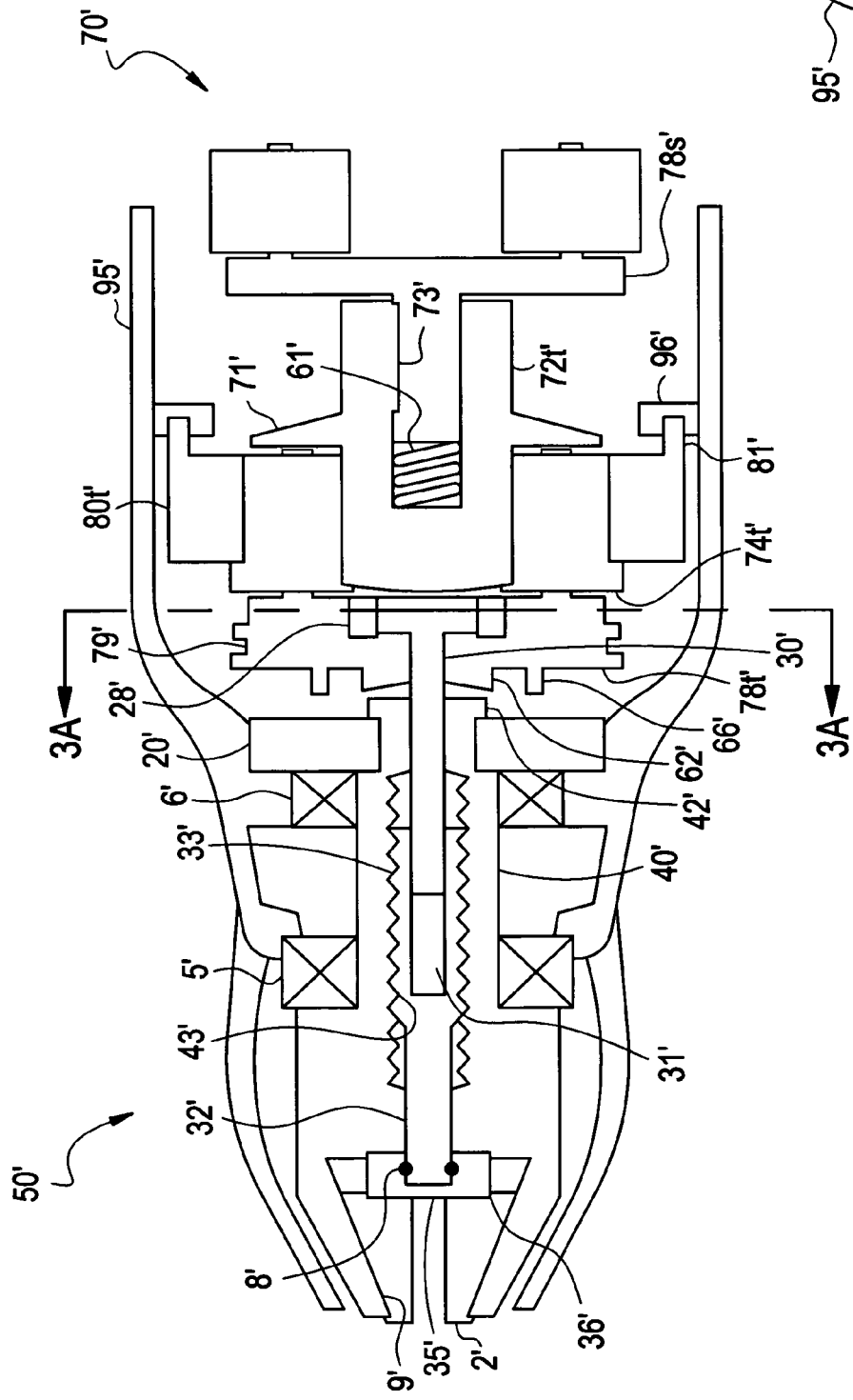

TOOL CHUCK WITH POWER TAKE OFF FEATURE

CROSS REFERENCE TO RELATED APPLICATIONS

This U.S. non-provisional application claims priority under 35 USC § 119 to U.S. Provisional Application No. 60/610,973 filed Sep. 20, 2004, the content of which is incorporated herein in its entirety by reference.

BACKGROUND

1. Field of the Invention

The present invention relates in general to tool chucks for attachment of accessories to power drivers, and more particularly to a tool chuck having chuck jaws that may be actuated via power from the driver's transmission.

2. Description of Related Art

Conventional tool chucks may have a turn ring that is rotatable using a chuck key to extend and retract chuck jaws. Although such tool chucks are generally thought to provide acceptable performance, they are not without shortcomings. For example, the conventional tool chuck requires cumbersome chuck key operations, chuck key retention, and other inconveniences.

In view of the shortcomings associated with chuck keys, tool chucks have been developed that have a turn ring (or sleeve) that is rotated manually, without using a chuck key, to tighten the chuck jaws. Other developments include a tool chuck that utilizes power from the power driver to open and close the chuck jaws. To this end, the tool chuck may be provided with a sleeve that is axially moveable to a position in which the sleeve is grounded (i.e., rotationally fixed) to the housing of the power driver. Thus, when the driver is powered up, a spindle of the driver (and consequently the chuck jaws) rotates relative to the sleeve. The relative rotation between the spindle and the sleeve may tighten or loosen the chuck jaws.

Conventional keyless tool chucks have associated disadvantages. For example, they require an operator to manipulate the sleeve (i.e., rotate the sleeve and/or slide the sleeve axially). Such manipulations may be difficult, especially when the operator attempts to simultaneously insert an accessory into the chuck jaws. Also, an operator may inadvertently release a grounded condition between the sleeve and the tool housing when the tool is powered up.

SUMMARY

According to an example, non-limiting embodiment, a tool chuck may include a shaft supporting chuck jaws. The shaft may provide a first transmission power path for rotationally driving the chuck jaws. The shaft may have a through hole. A chuck actuating mechanism may be provided in the through hole. The chuck actuating mechanism may provide a second transmission power path for opening and closing the chuck jaws.

According to another example, non-limiting embodiment, a tool chuck may include a shaft supporting chuck jaws. The shaft may provide a first transmission power path to the chuck jaws. The shaft may have a through hole. A chuck actuating mechanism may be mounted in the through hole. The chuck actuating mechanism may provide a second transmission power path to the chuck jaws.

According to another example, non-limiting embodiment, a tool transmission may include a carrier supporting at least one planetary gear. A sun gear may be connected to the carrier. The sun gear and the carrier may be rotationally locked together and axially moveable relative to each other.

According to another example, non-limiting embodiment, a power tool may include a housing. A transmission may be mounted on the housing. The transmission may have a primary rotational axis. A collar may be mounted on the housing. The collar may be moveable relative to the housing to displace at least one element of the transmission along the primary rotational axis. A central axis of the collar may be offset from the primary rotational axis.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

BRIEF DESCRIPTION OF THE DRAWINGS

Example embodiments of the present invention will become more fully understood from the detailed description below and the accompanying drawings, wherein like elements are represented by like reference numerals, which are given by way of illustration only and thus are not limiting of the present invention.

FIGS. 2 and 3 are schematic illustrations of a tool chuck with a power take off feature according to another example, non-limiting embodiment of the present invention.

DETAILED DESCRIPTION OF EMBODIMENTS

I. Example Embodiment Depicted in FIG. 1

Figure 1:
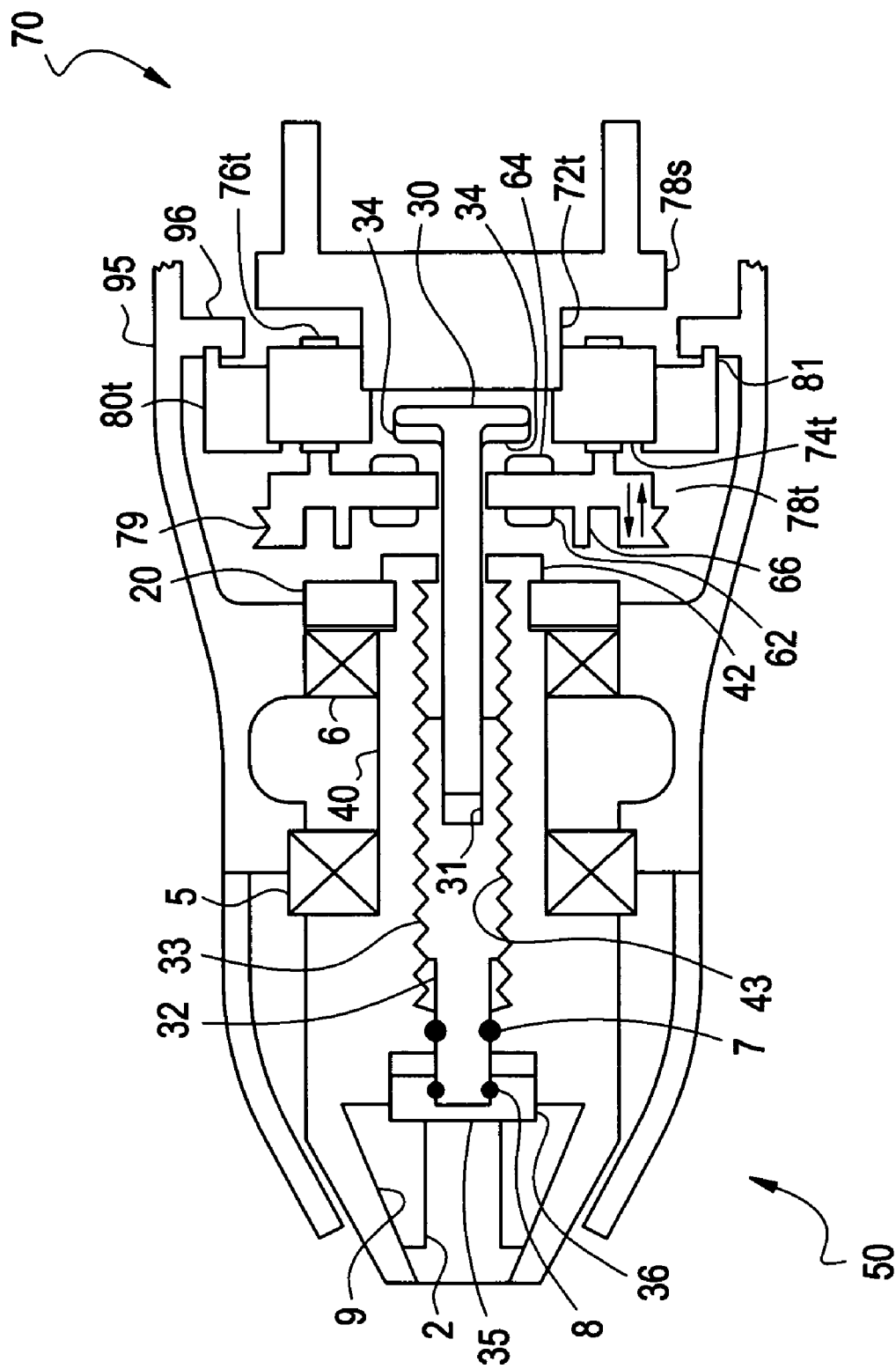
FIG. 1 is a schematic illustration of a tool chuck with a power take off feature according to an example, non-limiting embodiment of the present invention.

FIG. 1 shows an example, non-limiting embodiment of a tool chuck 50 with a power take off feature. The tool chuck 50 may be provided on a power driver (e.g., a drill) for holding a tool (e.g., a drill bit). It will be appreciated, however, that the tool chuck 50 may be suitably implemented on a variety of power drivers (other than drills) for holding a variety of tools (other than drill bits).

A. The Structure:

With reference to FIG. 1, the tool chuck 50 may be connected to the transmission 70 of a power driver. The transmission 70 may couple an electric motor (not shown) to the tool chuck 50. The transmission 70 may use gearing to effect a change in the ratio between an input rpm (from the electric motor) and an output rpm (delivered to the tool chuck 50).

In this example embodiment, the transmission 70 may include three planetary reduction systems. It will be appreciated, however, that the invention is not limited in this regard. For example, more or less than three planetary reduction systems may be implemented. Further, transmissions other than planetary reduction system transmissions (e.g., conventional parallel axis transmissions) may be suitably implemented.

For clarity of illustration, only a single planetary reduction system (the "third stage reduction system") is illustrated in FIG. 1. The third stage reduction system may include a third stage sun gear 72t fixed on the front side of a second stage carrier 78s. A plurality of third stage planetary gears 74t may engage with the third stage sun gear 72t. Each third stage planetary gear 74t may be rotatably mounted on a respective shaft 76t that is supported by a third stage carrier 78t. A third stage ring gear 80t may engage with the third stage planetary gears 74t.

The third stage ring gear 80t may be moveable in an axial direction relative to the housing 95 of the power driver to selectively operate the third stage reduction system. The third stage reduction system may become operative by moving the third stage ring gear 80t to an axial rearward position, as shown in FIG. 1. Here, the third stage ring gear 80t may be rotationally fixed to the housing 95 via cooperating features. For example, and not as a limitation of the invention, the third stage ring gear 80t may have longitudinal protrusions 81 that may engage with fixing elements 96 of the housing 95. Such cooperating features are well known in this art, and therefore a detailed description of the same is omitted. When the third stage reduction system is operative, one rotation of the third stage sun gear 72t may cause only a fractional rotation of the third stage carrier 78t.

The third stage reduction system may become inoperative by moving the third stage ring gear 80t to an axial forward position. In the axial forward position, the cooperating features 81, 96 of the third stage ring gear 80t and the housing 95, respectively, may disengage so that the third stage ring gear 80t may be rotatable relative to the housing 95. Further, the third stage ring gear 80t may engage with the third stage planetary gears 74t, as well as the third stage carrier 78t. When the third stage reduction system is inoperative, the third stage sun gear 72t, the third stage planetary gears 74t, and the third stage carrier 78t may rotate together as a unit.

The first and the second stage reduction systems may be similar to the third stage reduction system discussed above. For example, in the second stage reduction system, the second stage sun gear may be provided on the front side of the first stage carrier. In the first stage reduction system, the first stage sun gear may be rotationally fixed to a rotary shaft of the electric motor.

All of the reduction systems of the transmission 70 may include a respective ring gear that is axially moveable to selectively operate the same. Each ring gear may respectively support a radially oriented cam follower. For example, the outer surface of the ring gear may be provided with a continuous, circumferential groove in which a wire is provided. The wire, which may be slidable through the circumferential groove, may have free ends that extend in a radial direction and out of the circumferential groove. The free ends of the wire may constitute cam followers for the corresponding ring gear. The cam followers may be received in respective slots of a shift collar mounted on the housing 95. Upon rotating the shift collar, the slots may influence the cam followers (and thus the corresponding ring gears) to the desired axial positions. The shift collar will be discussed in greater detail below in section V.

The input of a particular stage (via the corresponding sun gear) is the output of the immediately preceding stage (via the preceding carrier). Thus, the three reduction systems may operate in combination or individually to obtain the desired transmission output.

In this example embodiment, power may be taken off the transmission 70 via the third stage carrier 78t. To this end, the third stage carrier 78t may have a front surface provided with drive lugs 62 and a rear surface provided with drive lugs 64. Also, the third stage carrier 78t may be axially moveable relative to the housing 95 between a forward position and a rearward position. When the third stage carrier 78t is in the axial forward position, the drive lugs 62 may interact with lugs 42 provided on an input shaft 40. In this condition, the third stage carrier 78t and the input shaft 40 may be rotationally fixed together so that transmission power may be delivered for rotationally driving the tool chuck 50 (in a normal operating mode). When the third stage carrier 78t is in the axial rearward position, the drive lugs 62 may disengage the input shaft 40 and the drive lugs 64 may interact with lugs 34 on a chuck actuating shaft 30. In this condition, the third stage carrier 78t and the chuck actuating shaft 30 may be rotationally fixed together so that transmission power may be delivered for actuating the tool chuck 50 (in a chuck actuating mode).

The third stage carrier 78t may include an opening through which the chuck actuating shaft 30 extends. In FIG. 1, the third stage carrier 78t is at an axial intermediate position (i.e., between the axial forward position and the axial rearward position). Here, the third stage carrier 78t may be, axially and rotationally moveable with respect to both the input shaft 40 and the chuck actuating shaft 30.

An outer surface of the third stage carrier 78t may be provided with a continuous, circumferential groove 79 in which a wire (not shown) is provided. The wire, which may be slidable through the circumferential groove 79, may have free ends that extend in a radial direction and out of the circumferential groove 79. The free ends of the wire may constitute cam followers. The cam followers may be received in a slot of the shift collar mounted on the housing 95. Upon rotating the shift collar, the slot may influence the cam follower (and thus the third stage carrier 78t) to the desired axial position.

The input shaft 40 may be mounted for rotation (via bearings 5, 6) in the housing 95. In this example embodiment, the forward end of the input shaft 40 may include inclined passageways 9 through which chuck jaws 2 are respectively slidable. The inclined passageways 9 may rotationally fix the input shaft 40 to the chuck jaws 2. The input shaft 40 may include a bore having radially inward facing threads 43 that interact with radially outward facing threads 33 of a chuck actuating screw 32. That is, the input shaft 40 may be screw coupled to the chuck actuating screw 32. An o-ring 7, which may be provided between the input shaft 40 and the chuck actuating screw 32, may prevent debris from penetrating into and contaminating the inside of the tool chuck 50 and the transmission 70.

The chuck actuating screw 32 may be supported by the input shaft 40. The interaction of the threads 33, 43 may cause the chuck actuating screw 32 to advance or retract in the axial direction relative to the input shaft 40. A rear end of the chuck actuating screw 32 may include a blind hole 31 that receives the forward end of the chuck actuating shaft 30. The chuck actuating screw 32 and the chuck actuating shaft 30 may be rotationally fixed together and the chuck actuating screw 32 may be axially moveable relative chuck actuating shaft 30. For example, the blind hole 31 may include a longitudinal spline (not shown) that may be received by a corresponding feature provided on the chuck actuating shaft 30. Such spline couplings (and other alternative couplings) are well known in this art, and therefore a detailed discussion of the same is omitted. The forward end of the chuck actuating screw 32 may support a pusher head 35.

The pusher head 35 may be mounted for rotation on the chuck actuating screw 32. A bearing 8 may be provided to facilitate the relative rotation between the pusher head 35 and the chuck actuating screw 32. The pusher head 35 may include radially oriented passageways 36 in which the chuck jaws 2 are respectively supported. The radially oriented passageways 36 may guide a radial movement of the chuck jaws 2, and at the same time may rotationally fix the chuck jaws 2 to the pusher head 35.

An automatic spindle lock 20 may be mounted between the input shaft 40 and the housing 95. It will be appreciated that automatic spindle locks are conventionally known in this art. For example, a representative automatic spindle lock is described in U.S. Pat. No. 6,311,787, the entire contents of which is incorporated herein by reference. The automatic spindle lock described in U.S. Pat. No. 6,311,787 could be suitably implemented in the example embodiment depicted in FIG. 1 with only slight modifications that may be readily apparent to those skilled in the art. In any event, the automatic spindle lock 20, which is only schematically illustrated in FIG. 1, may provide the following functionality.

On the one hand, the automatic spindle lock 20 may allow the input shaft 40 to rotate (relative to the housing 95) when the third stage carrier 78t is in the axial forward position (i.e., during the normal operating mode). Here, drive lugs 66 on the front surface of the third stage carrier 78t may interact with a roller cage (not shown) of the automatic spindle lock 20. When the driver is powered up, the third stage carrier 78t (via the drive lugs 66) may rotationally drive the roller cage, thereby allowing the input shaft 40 to rotate relative to the housing 95.

On the other hand, the spindle lock 20 may prevent the input shaft 40 from rotating (relative to the housing 95) when the third stage carrier 78t is in the axial rearward position (i.e., during the chuck actuating mode). Here, the drive lugs 66 may disengage the automatic spindle lock 20. Thus, when the driver is powered up, the third stage carrier 78t may not rotationally drive the roller cage so that the input shaft 40 may be rotationally locked to the housing 95.

B. The Operation:

The tool chuck 50 may operate differently depending on the axial position of the third stage carrier 78t. On the one hand, when the third stage carrier 78t is in the axial forward position, the power output from the transmission 70 may rotationally drive the tool chuck 50 in the normal operating mode. On the other hand, when the third stage carrier 78t is in the axial rearward position, the power output from the transmission 70 may actuate the tool chuck 50 to open or close the chuck jaws 2 in the chuck actuating mode.

More specifically, to achieve the normal operating mode, the operator may rotate the shift collar (relative to the housing 95) to influence the third stage carrier 78t to the axial forward position. When the driver is powered up, the drive lugs 62 of the third stage carrier 78t may rotationally drive the input shaft 40 (via the lugs 42), and the drive lugs 66 may rotationally drive the roller cage of the automatic spindle lock 20. At this time, the third stage carrier 78t, the roller cage, and the input shaft 40 may be driven at the same rotational speed relative to the housing 95.

The input shaft 40, via the inclined passageways 9, may rotate together with the chuck jaws 2. The chuck jaws 2, which are seated in the radial passageways 36, may rotationally drive the pusher head 35. The chuck actuating screw 32 and the chuck actuating shaft 30 may rotate together with the input shaft 40. Thus, the input shaft 40', the chuck jaws 2, the pusher head 35, the chuck actuating screw 32, and the chuck actuating shaft 30 may rotate together as a unit relative to the housing 95.

To achieve the chuck actuating mode, the operator may rotate the shift collar (relative to the housing 95) to influence the third stage carrier 78t to the axial rearward position. Here, the drive lugs 62, 66 may respectively disengage from the lugs 42 of the input shaft 40 and the roller cage of the automatic spindle lock 20. When the driver is powered up, the drive lugs 64 of the third stage carrier 78t may rotationally drive the chuck actuating shaft 30 (via the lugs 34). At this time, the third stage carrier 78t and the chuck actuating-shaft 30 (and thus the chuck actuating screw 32) may be driven at the same rotational speed relative to the housing 95.

The chuck actuating screw 32 may rotate relative to the input shaft 40, which may be rotationally locked to the housing 95 via the automatic spindle lock 20. This relative rotation may cause the chuck actuating screw 32 to advance or retract in the axial direction (depending on the rotation direction of the screw 32) by virtue of the interaction between the radially inward facing threads 43 and the radially outward facing threads 33. The translational movement of the chuck actuating screw 32 may push or pull on the pusher head 35.

The pusher head 35 may remain rotationally fixed to the input shaft 40 (via the chuck jaws 2 being situated in the radial passageways 36 and the inclined passageways 9). Thus, the chuck actuating screw 32 may rotate relative to the pusher head 35. The translational movement of the pusher head 35 may push or pull on the chuck jaws 2, thereby opening and/or closing the same.

For example, during a closing operation, the chuck actuating screw 32 (together with the pusher head 35 and the chuck jaws 2) may be advanced in the axial direction. During this time, the inclined passageways 9 of the input shaft 40 may influence the chuck jaws 2 in a radial inward direction through the radially oriented passageways 36 of the pusher head 35.

II. Example Embodiment Depicted in FIGS. 2 and 3

FIGS. 2 and 3 show another example, non-limiting embodiment of a tool chuck 50' with a power take off feature. This example embodiment is similar to the example embodiment discussed above in section I. However, in this example embodiment, the second stage carrier 78s' and the third stage sun gear 72t' may be axially moveable with respect to each other.

A. The Structure:

With reference to FIG. 2, the tool chuck 50' may be connected to the transmission 70' of a power driver. The transmission 70' may couple an electric motor (not shown) to the tool chuck 50'.

In this example embodiment, the transmission 70' may include three planetary reduction systems. But the invention is not limited in this regard.

The third, stage reduction system of the transmission 70' is illustrated in FIG. 2. The third stage reduction system may include a third stage sun gear 72t' provided on the front side of a second stage carrier 78s'. Here, the third stage sun gear 72t' and the second stage carrier 78s' may be rotationally fixed together and axially moveable relative to each other. By way of example only, and not as a limitation of the invention, the third stage sun gear 72t' may include a longitudinal spline 73' that is received by a cooperating feature provided on the second stage carrier 78s'.

A compression spring 61' may be provided between the second stage carrier 78s' and the third stage sun gear 72t'. The compression spring 61' may urge the third stage sun gear 72t' in an axial forward direction. The third stage sun gear 72t' may include a flange 71'.

A plurality of third stage planetary gears 74t' may engage with the third stage sun gear 72t'. Each third stage planetary gear 74t' may be rotatably mounted on a respective shaft that is supported by a third stage carrier 78t'. A third stage ring gear 80t' may engage with the third stage planetary gears 74t'.

The third stage ring gear 80t' may be moveable in an axial direction relative to the housing 95' of the power driver to selectively operate the third stage reduction system. A shift collar may be implemented to axially move the third stage ring gear 80t'.

Power may be taken off the transmission 70' via the third stage carrier 78t'. To this end, the third stage carrier 78t' may have a front surface provided with drive lugs 62'. Also, the third stage carrier 78t' may be axially moveable relative to the housing 95' between a forward position and a rearward position. When the third stage carrier 78t' is in the axial forward position (as shown in FIG. 2), the drive lugs 62' may interact with lugs 42' provided on an input shaft 40'. In this condition, the third stage carrier 78t' and the input shaft 40' may be rotationally fixed together so that transmission power may be delivered for rotationally driving the tool chuck 50' (in a normal operating mode). When the third stage carrier 78t' is in the axial rearward position (as shown in FIG. 3), the drive lugs 62' may disengage the input shaft 40'. In this condition, transmission power may be delivered for actuating the tool chuck 50' (in a chuck actuating mode).

The third stage carrier 78t' may include an opening through which a chuck actuating shaft 30' extends. The third stage carrier 78t' may be axially fixed and rotationally coupled to the chuck actuating shaft 30'. For example, and turning briefly to FIG. 3A, the third stage carrier 78t' and the chuck actuating shaft 30' may have corresponding shapes, and an elastomeric member 28' may be interposed between the third stage carrier 78t' and the chuck actuating shaft 30'. As will be described in more detail below, the elastomeric member 28' may be elastically compressible to allow some relative rotation to occur between the third stage carrier 78t' and the chuck actuating shaft 30'. The chuck actuating shaft 30' may be rotatable relative to the input shaft 40'.

An outer surface of the third stage carrier 78t' may be provided with a continuous, circumferential groove 79' in which a wire (not shown) is provided. The wire, which may be slidable through the circumferential groove 79', may have free ends that extend in a radial direction and out of the circumferential groove 79'. The free ends of the wire may be received in a slot of the shift collar mounted on the housing 95'. Upon rotating the shift collar, the slot may influence the wire (and thus the third stage carrier 78t') to the desired axial position.

The input shaft 40' may be mounted for rotation (via bearings 5', 6') in the housing 95'. The forward end of the input shaft 40' may include inclined passageways 9' through which chuck jaws 2' are, respectively slidable. The inclined passageways 9' may rotationally fix the input shaft 40' to the chuck jaws 2'. The input shaft 40' may include a bore having radially inward facing threads 43' that interact with radially outward facing threads 33' of a chuck actuating screw 32'.

The chuck actuating screw 32' may be supported by the input shaft 40'. The interaction of the threads 33', 43' may cause the chuck actuating screw 32' to advance or retract in the axial direction relative to the input shaft 40'. A rear end of the chuck actuating screw 32' may include a blind hole 31' that receives the forward end of the chuck actuating shaft 30'. The chuck actuating screw 32' and the chuck actuating shaft 30' may be rotationally fixed together and axially moveable relative to each other. For example, the blind hole 31' may include a longitudinal spline (not shown) that may be received by a corresponding feature provided on the chuck actuating shaft 30'. The forward end of the chuck actuating screw 32' may support a pusher head 35'.

The pusher head 35' may be mounted for rotation on the chuck actuating screw 32'. A bearing 8' may be provided to facilitate the relative rotation between the pusher head 35' and the chuck actuating screw 32'. The pusher head 35', may include radially oriented passageways 36' in which the chuck jaws 2' are respectively supported. The radially oriented passageways 36' may guide a radial movement of the chuck jaws 2', and at the same time may rotationally fix the chuck jaws 2' to the pusher head 35'.

An automatic spindle lock 20' may be mounted between the input shaft 40' and the housing 95'. On the one hand, the automatic spindle lock 20' may allow the input shaft 40' to rotate (relative to the housing 95') when the third stage carrier 78t' is in the axial forward position (i.e., during the normal operating mode) as shown in FIG. 2. Here, drive lugs 66' on the front surface of the third stage carrier 78t' may interact with a roller cage (not shown) of the automatic spindle lock 20'. When the driver is powered up, the third stage carrier 78t' (via the drive lugs 66') may rotationally drive the roller cage, thereby allowing the input shaft 40' to rotate relative to the housing 95'.

On the other hand, the spindle lock 20' may prevent the input shaft 40' from rotating (relative to the housing 95') when the third stage carrier 78t' is in the axial rearward position (i.e., during the chuck actuating mode) as shown in FIG. 3. Here, the drive lugs 66' may disengage the automatic spindle lock 20'. Thus, when the driver is powered up, the third stage carrier 78t' may not rotationally drive the roller cage so that the input shaft 40' may be rotationally locked to the housing 95'.

B. The Operation:

The tool chuck 50' may operate differently depending on the axial position of the third stage carrier 78t'. On the one hand, when the third stage carrier 78t' is in the axial forward position, the power output from the transmission 70' may rotationally drive the tool chuck 50' in the normal operating mode. On the other hand, when the third stage carrier 78t' is in the axial rearward position, the power output from the transmission 70' may actuate the tool chuck 50' to open or close the chuck jaws 2' in the chuck actuating mode.

More specifically, to achieve the normal operating mode, the operator may rotate the shift collar (relative to the housing 95') to influence the third stage carrier 78t' to the axial forward position shown in FIG. 2. At this time, the spring 61' may influence the third stage sun gear 72t' to move in an axial forward direction together with the third stage carrier 78t'. The forward travel of the third stage sun gear 72t' may be limited by the chuck actuating shaft 30' (which may move axially together with the third stage carrier 78t' and relative to the chuck actuating screw 32'). Thus, the flange 71' of the third stage sun gear 72t' may ensure that the third stage planets 74t' remain in the desired position on the third stage carrier 78t'. In this regard, the flange 71' may serve as a keeper.

When the driver is powered up, the drive lugs 62' of the third stage carrier 78t' may rotationally drive the input shaft 40' (via the lugs 42'), and the drive lugs 66' may rotationally drive the roller cage of the automatic spindle lock 20'. The third stage carrier 78t' may also rotationally drive the chuck actuating shaft 30'. Thus, the third stage carrier 78t', the roller cage, the input shaft 40', and the chuck actuating shaft 30' may be driven at the same rotational speed relative to the housing 95'. Here, a relative rotation may occur between the chuck actuating shaft 30' and the third stage sun gear 72t'.

The input shaft 40', via the inclined passageways 9', may rotate together with the chuck jaws 2'. The chuck jaws 2', which are seated in the radial passageways 36', may rotationally drive the pusher head 35'. The chuck actuating screw 32' and the chuck actuating shaft 30' may rotate together with the input shaft 40'. Thus, the input shaft 40', the chuck jaws 2', the pusher head 35', the chuck actuating screw 32', and the chuck actuating shaft 30' may rotate together as a unit relative to the housing 95'.

To achieve the chuck actuating mode, the operator may rotate the shift collar (relative to the housing 95') to influence the third stage carrier 78t' to the axial rearward position shown in FIG. 3. The chuck actuating shaft 30' (which may move axially together with the third stage carrier 78t' and relative to the chuck actuating screw 32') may drive the third stage sun gear 72t' in an axial rearward direction against the influence of the spring 61'. As shown in FIG. 3, the drive lugs 62', 66' may respectively disengage from the lugs 42' of the input shaft 40' and the roller cage of the automatic spindle lock 20'.

When the driver is powered up, the third stage carrier 78t' may rotationally drive the chuck actuating shaft 30'. At this time, the third stage carrier 78t' and the chuck actuating shaft 30' (and thus the chuck actuating screw 32') may be driven at the same rotational speed relative to the housing 95'.

The chuck actuating screw 32' may rotate relative to the input shaft 40', which may be rotationally locked to the housing 95 via the automatic spindle lock 20'. This relative rotation may cause the chuck actuating screw 32' to advance or retract in the axial direction (depending on the rotation direction of the screw 32') by virtue of the interaction between the radially inward facing threads 43' and the radially outward facing threads 33'. The translational movement of the chuck actuating screw 32' may push or pull on the pusher head 35'.

The pusher head 35' may remain rotationally fixed to the input shaft 40' (via the chuck jaws 2' being situated in the radial passageways 36' and the inclined passageways 9'). Thus, the chuck actuating screw 32' may rotate relative to the pusher head 35'. The translational movement of the pusher head 35' may push or pull on the chuck jaws 2', thereby opening and/or closing the same.

The elastomeric member 28' situated between the chuck actuating shaft 30' and the third stage carrier 78t' may function as follows. Assume that the driver is being operated in the chuck actuating mode to close the chuck jaws 2' on an accessory. Once the tool chuck 50' is tight (i.e., when the chuck jaws 2' clamp the accessory), the chuck actuating shaft 30' may stop rotating. At this time, the power from the transmission 70' may continue to rotationally drive the third stage carrier 78t', thereby causing a relative rotation to occur between the third stage carrier 78t' and the chuck actuating shaft 30'. This relative rotation may compress the elastomeric member 28'. In this way, the elastomeric member 28' may make the end of the clamping operation less abrupt and gentler on the transmission 70'. Further, the angular compliance provided by the elastomeric member 28' may make it easier to re-engage the drive lugs in the forward position.

III. Example Embodiment Depicted in FIGS. 4 and 5

Figure 4:
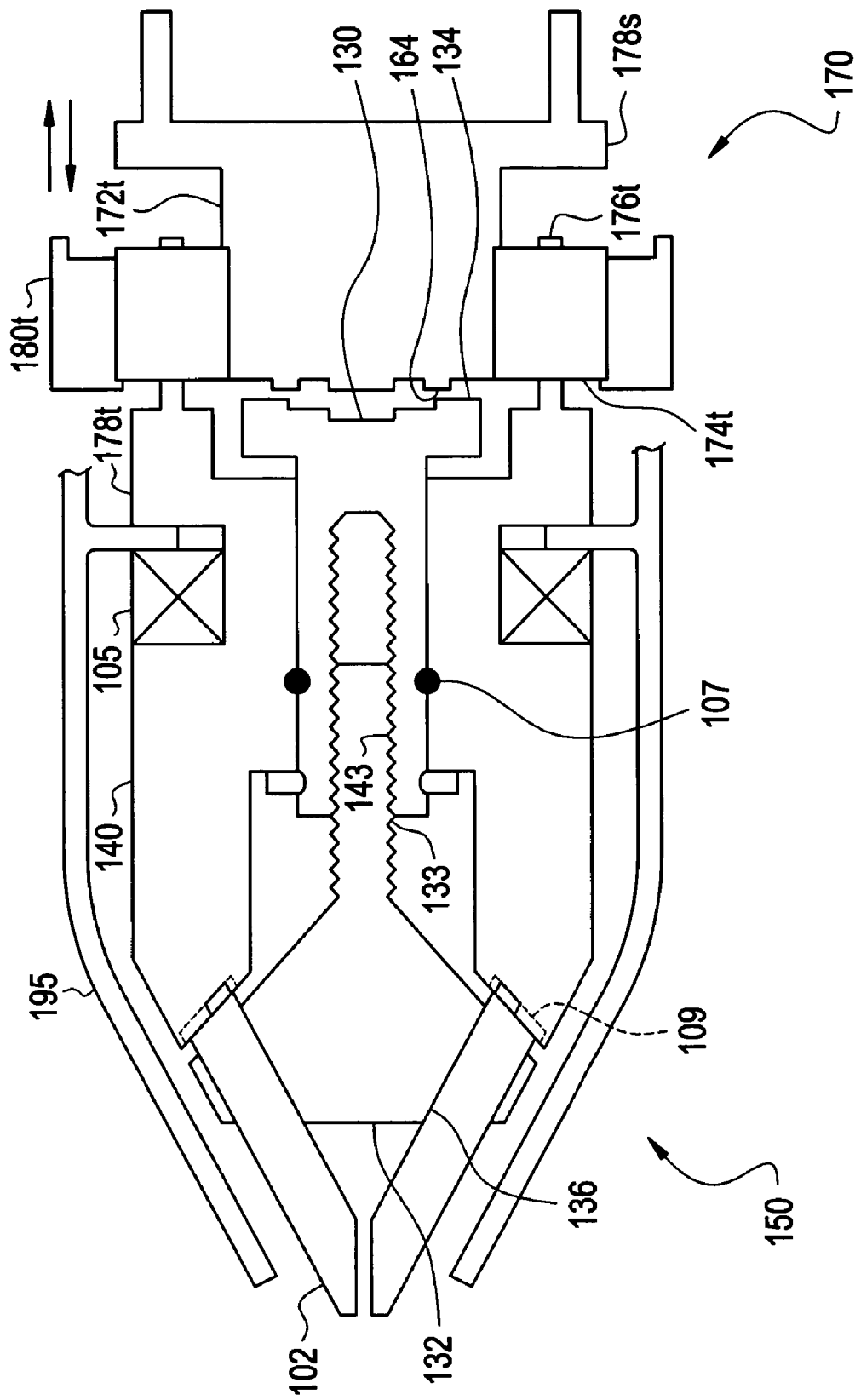
FIG. 4 is a schematic illustration of a tool chuck with a power take off feature according to another example, non-limiting embodiment of the present invention.

FIG. 4 shows another example, non-limiting embodiment of a tool chuck 150 with a power take off feature. This example embodiment is similar to the previous example embodiment to the extent that it includes a power take off feature. However, there are several notable differences as described below.

A. The Structure:

With reference to FIG. 4, the tool chuck 150 may be connected to the transmission 170 of a power driver. The transmission 170 may couple an electric motor (not shown)- to the tool chuck 150.

As in the previous embodiment, the transmission 170 may include three planetary reduction systems. But the invention is not limited in this regard.

Only a single planetary reduction system (the "third stage reduction system") is illustrated in FIG. 4. The third stage reduction system may include a third stage sun gear 172t fixed on the front side of a second stage carrier 178s. A plurality of third stage planetary gears 174t may engage with the third stage sun gear 172t. Each third stage planetary gear 174t may be rotatably mounted on a respective shaft 176t that is supported by a third stage carrier 178t. A third stage ring gear 180t may engage with the third stage planetary gears 174t.

The first and the second stage reduction systems may be similar to the third stage reduction system. For example, all of the planetary reduction systems of the transmission 170 may include a respective ring gear that is axially moveable to selectively operate the same. The input of a particular stage (via the corresponding sun gear) is the output of the immediately preceding stage (via the preceding carrier). Thus, the three reduction systems may operate in combination or individually to obtain the desired transmission output.

In this example embodiment, power may be taken off the transmission 170 via the third stage carrier 178t. To this end, the third stage carrier 178t and an input shaft 140 may be rotationally fixed together so that transmission power may be delivered for rotationally driving the tool chuck 150 (in both a normal operating mode and a chuck actuating mode). By way of example only, and not as a limitation of the invention, the third stage carrier 178t and the input shaft 140 may be of a unitary, one-piece construction.

In this example embodiment, power may also be taken off the transmission 170 via the third stage sun gear 172t. As noted above, the third stage sun gear 172t may be fixed on the front side of the second stage carrier 178s, and in this regard power may be taken off the transmission 170 via the second (or previous) stage reduction system. To this end, the third stage sun gear 172t may have a front surface provided with drive lugs 164. Also, the third stage sun gear 172t (together with the second stage carrier 178s) may be axially moveable relative to the housing 195 between a forward position and a rearward position.

When the third stage sun gear 172t is in the axial forward position, the drive lugs 164 may interact with lugs 134 provided on a chuck actuating shaft 130. In this condition, the third stage sun gear 172t and the chuck actuating shaft 130 may be rotationally fixed together so that transmission power may be delivered for actuating the tool chuck 150 (in the chuck actuating mode). When the third stage sun gear 172t is in the axial rearward position depicted in FIG. 1, the drive lugs 164 may disengage the chuck actuating shaft 130. In this condition, the third stage sun gear 172t and the chuck actuating shaft 130 may rotate relative to each other (in the normal operating mode).

Figure 5:
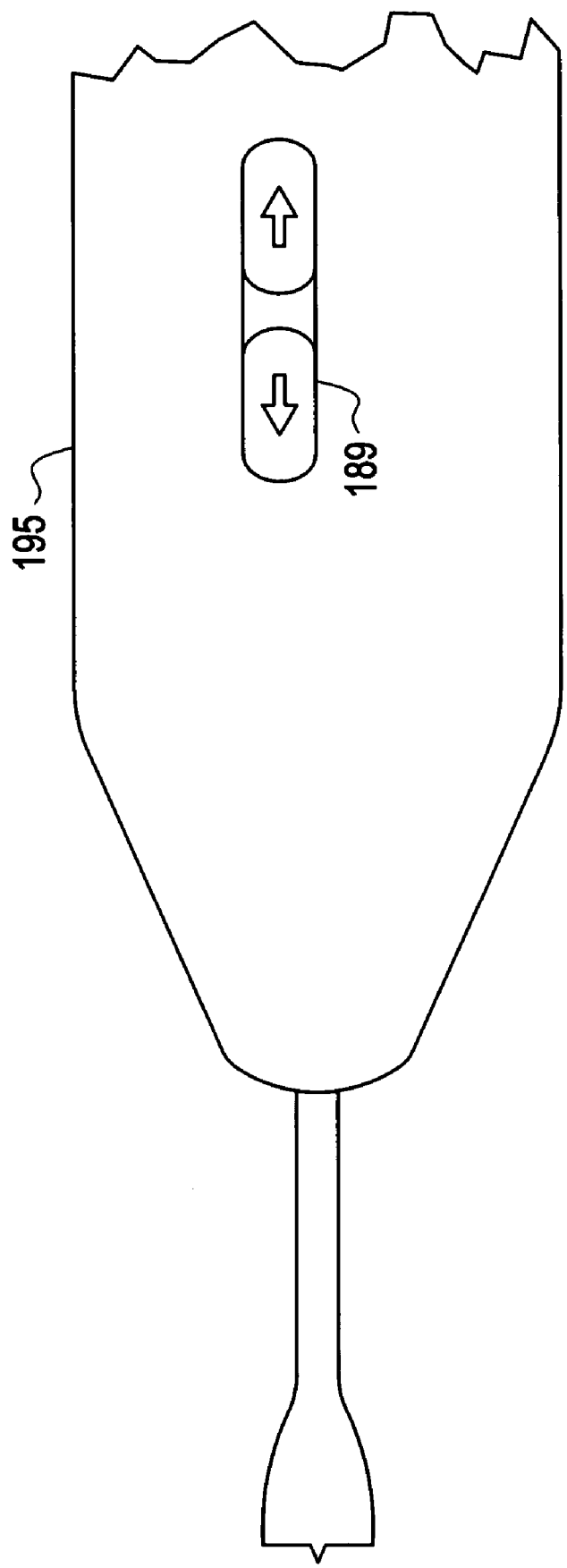
FIG. 5 is partial side view of a button that may be implemented to shift operating modes of the example tool chuck depicted in FIG. 4.

An outer surface of the second stage carrier 178s may be provided with a continuous, circumferential groove in which a wire is provided. The wire, which may be slidable through the circumferential groove, may have free ends that extend in a radial direction and out of the circumferential groove. Turning briefly to FIG. 5, the free ends of the wire may be coupled to a button 189 mounted for axial movement on the housing 195. The button 189 may be moved relative to the housing 195, thereby influencing the wire (and thus the second stage carrier 178s and the third stage sun gear 172t) to the desired axial position. The button 189 may be operatively connected to a switch for selectively powering up the driver. Here, the switch may power up the driver when the button 189 is manipulated to place the second stage carrier 178s and the third stage sun gear 172t in the axial forward position.

It will be readily apparent to those skilled in the art that the second stage carrier 178s may be positioned axially by structure other than the button 189 depicted in FIG. 5. For example, the free ends of the wire provided on the second stage carrier 178s may be received in a slot of the shift collar. Upon rotating the shift collar, the slot may influence the wire (and thus the second stage carrier 178s) to the desired axial position. Since the shift collar may also be used to axially position the ring gears of the planetary reduction systems, the driver may be operated in the chuck actuating mode at a pre-determined gear reduction and torque.

Turning back to FIG. 4, the input shaft 140 may be mounted for rotation (via a bearing 105) in the housing 195. In this example embodiment, the forward end of the input shaft 140 may include passageways 10 through which chuck jaws 102 are respectively slidable. The passageways 109 may guide a radial movement of the chuck jaws 102, and at the same time may rotationally fix the input shaft 140 to the chuck jaws 102. The input shaft 140 may include a bore through which the chuck actuating shaft 130 extends. The input shaft 140 and the chuck actuating shaft 130 may be axially fixed together and rotatable relative to each other. An o-ring 107, which may be provided between the input shaft 140 and the chuck actuating shaft 130, may prevent debris from penetrating into and contaminating the inside of the tool chuck 150 and the transmission 170.

The chuck actuating shaft 130 may have radially inward facing threads 143 that interact with radially outward facing threads 133 of a chuck actuating screw 132. That is, the chuck actuating shaft 130 may be screw coupled to the chuck actuating screw 132.

The chuck actuating screw 132 may be advanced or retracted in the axial direction relative to the chuck actuating shaft 130 (and thus the input shaft 140) due to the interaction of the threads 133, 143. The forward end of the chuck actuating screw 132 may include inclined passageways 136 in which the chuck jaws 102 are respectively supported. The inclined passageways 136 may rotationally fix the chuck jaws 102 to the chuck actuating screw 132.

B. The Operation:

The tool chuck 150 may operate differently depending on the axial position of the third stage sun gear 172t. On the one hand, when the third stage sun gear 172t is in the axial rearward position, the power output from the transmission 170 may rotationally drive the tool chuck 150 in the normal operating mode. On the other hand, when the third stage sun gear 172t is in the axial forward position, the power output from the transmission 170 may actuate the tool chuck 150 to open or close the chuck jaws 102 in the chuck actuating mode.

More specifically, to achieve the normal operating mode, the operator may move the button 189 (relative to the housing 195) to influence the second stage carrier 178s (and thus the third stage sun gear 172t) to the axial rearward position illustrated in FIG. 4. When the driver is powered up, the third stage carrier 178t may rotate together with the input shaft 140. At this time, the third stage sun gear 172t and the chuck actuating shaft 130 may rotate relative to each other and relative to the housing 195.

The input shaft 140, via the passageways 109, may rotate together with the chuck jaws 102, which are seated in the inclined passageways 136, may rotationally drive the chuck actuating screw 132. The chuck actuating screw 132 and the chuck actuating shaft 130 may rotate together with the input shaft 140. Thus, the input shaft 140, the chuck jaws 102, the chuck actuating screw 132, and the chuck actuating shaft 130 may rotate together as a unit relative to the housing 195.

To achieve the chuck actuating mode, the operator may move the button 189 (relative to the housing 195) to influence the second stage carrier 178s (and thus the third stage sun gear 172t) to the axial forward position. When the driver is powered up, the third stage carrier 178t may rotate together with the input shaft 140. By virtue of the passageways 109, 136, the input shaft 140, the chuck jaws 102, and the chuck actuating screw 132 may rotate together as a unit. At the same time, the drive lugs 164 of the third stage sun gear 172t may rotationally drive the chuck actuating shaft 130 (via the lugs 134).

When the third stage reduction is operative (as shown in FIG. 4), one rotation of the third stage sun gear 172t may cause (via the third stage planetary gears 174t and the rotationally fixed third stage ring gear 180t) only a fractional rotation of the third stage carrier 178t. In other words, relative to the housing 195, the third stage sun gear 172t (and thus the chuck actuating shaft 130) may rotate faster than the third stage carrier 178t (and thus the chuck actuating screw 132).

The speed differential between the rotationally driven chuck actuating shaft 130 and the rotationally driven chuck actuating screw 132 may result in a relative rotation between the two component parts. This relative rotation may advance or retract the chuck actuating screw 132 in the axial direction (depending on the rotation direction of the transmission 170 output) by virtue of the interaction between the radially inward facing threads 143 and the radially outward facing threads 133. As the chuck actuating screw 132 advances or retracts relative to the chuck actuating shaft 130 (and the input shaft 140), the chuck jaws 102 may slide through the passageways 136. The passageways 136 may influence the chuck jaws 102 to move radially and through the passageways 109 of the input shaft 140, thereby opening and/or closing the chuck jaws 102.

IV. Example Embodiment Depicted in FIG. 6

Figure 6:
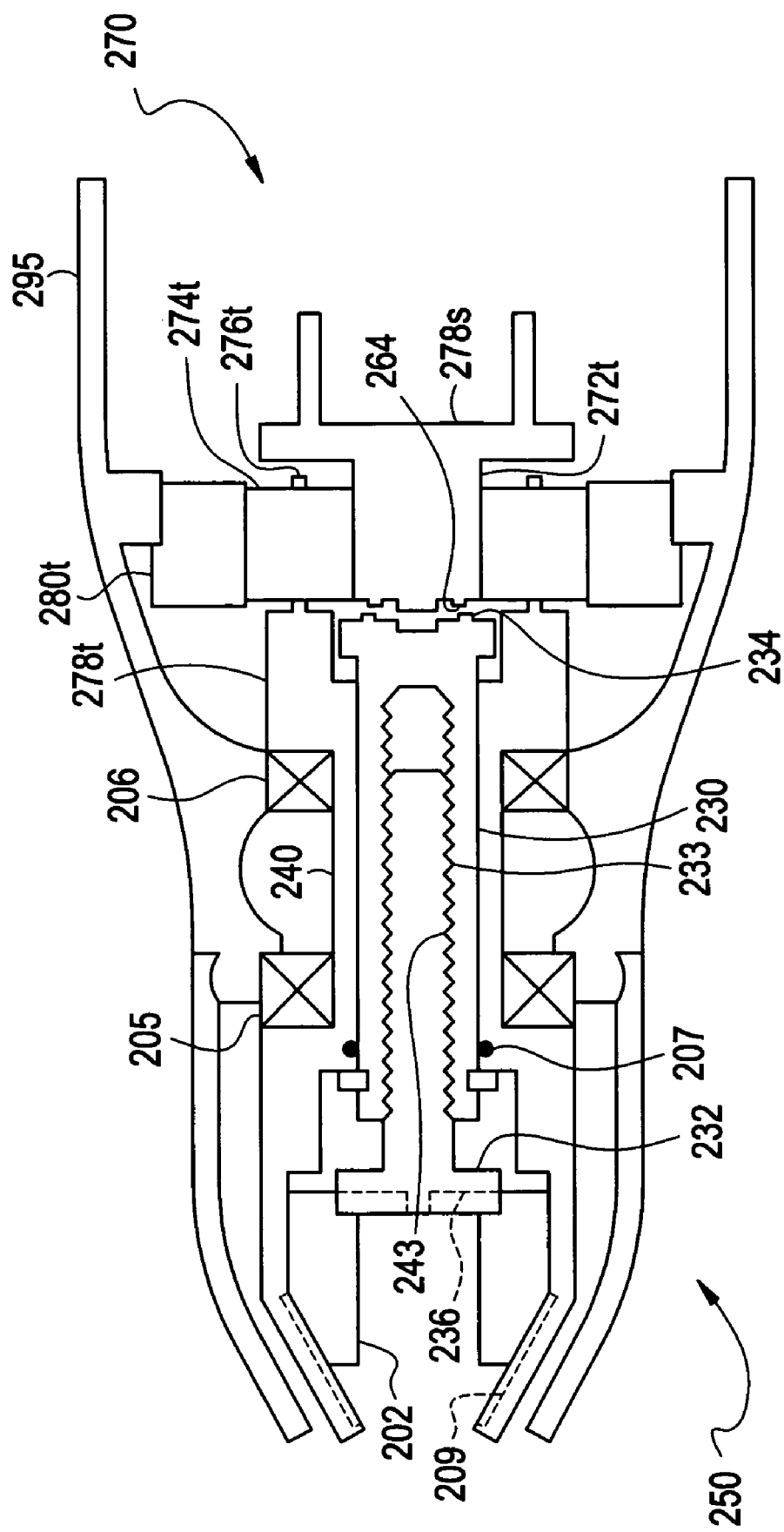
FIG. 6 is a schematic illustration of a tool chuck with a power take off feature according to another example, non-limiting embodiment of the present invention.

FIG. 6 shows another example, non-limiting embodiment of a tool chuck 250 with a power take off feature. This example embodiment is similar to the example embodiment discussed above in section III. However, this example embodiment may implement chuck jaws similar to those illustrated in FIG. 1.

A. The Structure:

FIG. 6 illustrates only a single planetary reduction system (the "third stage reduction system") of the transmission 270. The third stage reduction system may include a third stage sun gear 272t fixed on the front side of a second stage carrier 278s. A plurality of third stage planetary gears 274t may engage with the third stage sun gear 272t. Each third stage planetary gear 274t may be rotatably mounted on a respective shaft 276t that is supported by a third stage carrier 278t. A third stage ring gear 280t may engage with the third stage planetary gears 274t.

As in the previous embodiments, the transmission 270 may include additional planetary reduction systems (e.g. a first stage reduction system and a second stage reduction system) that may be similar to the illustrated third stage reduction system.

Power may be taken off the transmission 270 via the third stage carrier 278t. To this end, the third stage carrier 278t and an input shaft 240 may be rotationally fixed together so that transmission power may be delivered for rotationally driving the tool chuck 250 (in both a normal operating mode and a chuck actuating mode).

Power may also be taken off the transmission 270 via the third stage sun gear 272t. To this end, the third stage sun gear 272t may have a front surface provided with drive lugs 264. Also, the third stage sun gear 272t (together with the second stage carrier 278s) may be axially moveable relative to the housing 295 between a forward position and a rearward position.

When the third stage sun gear 272t is in the axial forward position, the drive lugs 264 may interact with lugs 234 provided on a chuck actuating shaft 230 so that transmission power may be delivered for actuating the tool chuck 250 (in the chuck actuating mode). When the third stage sun gear 272t is in the axial rearward position depicted in FIG. 6, the drive lugs 264 may disengage the chuck actuating shaft 230 so that the third stage sun gear 272t and the chuck actuating shaft 230 may rotate relative to each other (in the normal operating mode). The second stage carrier 278s (and thus the third stage sun gear 272t) may be moved to the desired axial position via a button (as described with reference to FIG. 3) or in the alternative, with the shift collar (described in more detail below).

The input shaft 240 may be mounted for rotation (via bearings 205, 206) in the housing 295. The forward end of the input shaft 240 may include inclined passageways 209 through which chuck jaws 202 are respectively slidable. The inclined passageways 209 may rotationally fix the input shaft 240 to the chuck jaws 202. The input shaft 240 may include a bore through which the chuck actuating shaft 230 extends. The input shaft 240 and the chuck actuating shaft 230 may be axially fixed together and rotatable relative to each other. An o-ring 207 may be provided between the input shaft 240 and the chuck actuating shaft 230.

The chuck actuating shaft 230 may have radially inward facing threads 243 that interact with radially outward facing threads 233 of a chuck actuating screw 232.

The chuck actuating screw 232 may be advanced or retracted in the axial direction relative to the chuck actuating shaft 230 (and thus the input shaft 240) due to the interaction of the threads 233, 243. The forward end of the chuck actuating screw 232 may include radially oriented passageways 236 in which the chuck jaws 202 are respectively supported. The radially oriented passageways 236 may guide a radial movement of the chuck jaws 202, and at the same time may rotationally fix the chuck jaws 202 to the chuck actuating screw 232.

B. The Operation:

The tool chuck 250 may operate in the normal operating mode when the third stage sun gear 272t is in the axial rearward position, and in the chuck actuating mode when the third stage sun gear 272t is in the axial forward position.

During the normal operating mode, i.e., when the second stage carrier 278s (and thus the third stage sun gear 272t) are in the axial rearward position illustrated in FIG. 6 and when the driver is powered up, the third stage carrier 278t may rotate together with the input shaft 240. At this time, the third stage sun gear 272t and the chuck actuating shaft 230 may rotate relative to each other and relative to the housing 295.

The input shaft 240 may rotate together with the chuck jaws 202, which may in turn rotationally drive the chuck actuating screw 232. The chuck actuating screw 232 and the chuck actuating shaft 230 may rotate together with the input shaft 240. Thus, the input shaft 240, the chuck jaws 202, the chuck actuating screw 232, and the chuck actuating shaft 230 may rotate together as a unit relative to the housing 295.

During the chuck actuating mode, i.e., when the second stage carrier 278s (and thus the third stage sun gear 272t) are in the axial forward position and when the driver is powered up, the third stage carrier 278t may rotate together with the input shaft 240, the chuck jaws 202, and the chuck actuating screw 232. At the same time, the drive lugs 264 of the third stage sun gear 272t may rotationally drive the chuck actuating shaft 230 (via the lugs 234).

When the third stage reduction is operative (as shown in FIG. 6), one rotation of the third stage sun gear 272t may cause only a fractional rotation of the third stage carrier 278t. In other words, relative to the housing 295, the third stage sun gear 272t (and thus the chuck actuating shaft 230) may rotate faster than the third stage carrier 278t (and thus the chuck actuating screw 132). This speed differential may cause the chuck actuating screw 232 to advance or retract in the axial direction by virtue of the interaction between the radially inward facing threads 243 and the radially outward facing threads 233.

The translational movement of the chuck actuating screw 232 relative to the chuck actuating shaft 230 (and the input shaft 240) may push or pull on the chuck jaws 202, thereby opening and/or closing the same. For example, during a closing operation, the chuck actuating screw 232 (together with the chuck jaws 202) may be advanced in the axial direction. During this time, the inclined passageways 209 of the input shaft 240 may influence the chuck jaws 202 in a radial inward direction through the radially oriented passageways 236 of the chuck actuating screw 232.

V. Example Embodiment Depicted in FIGS. 7 and 8

Figure 7:
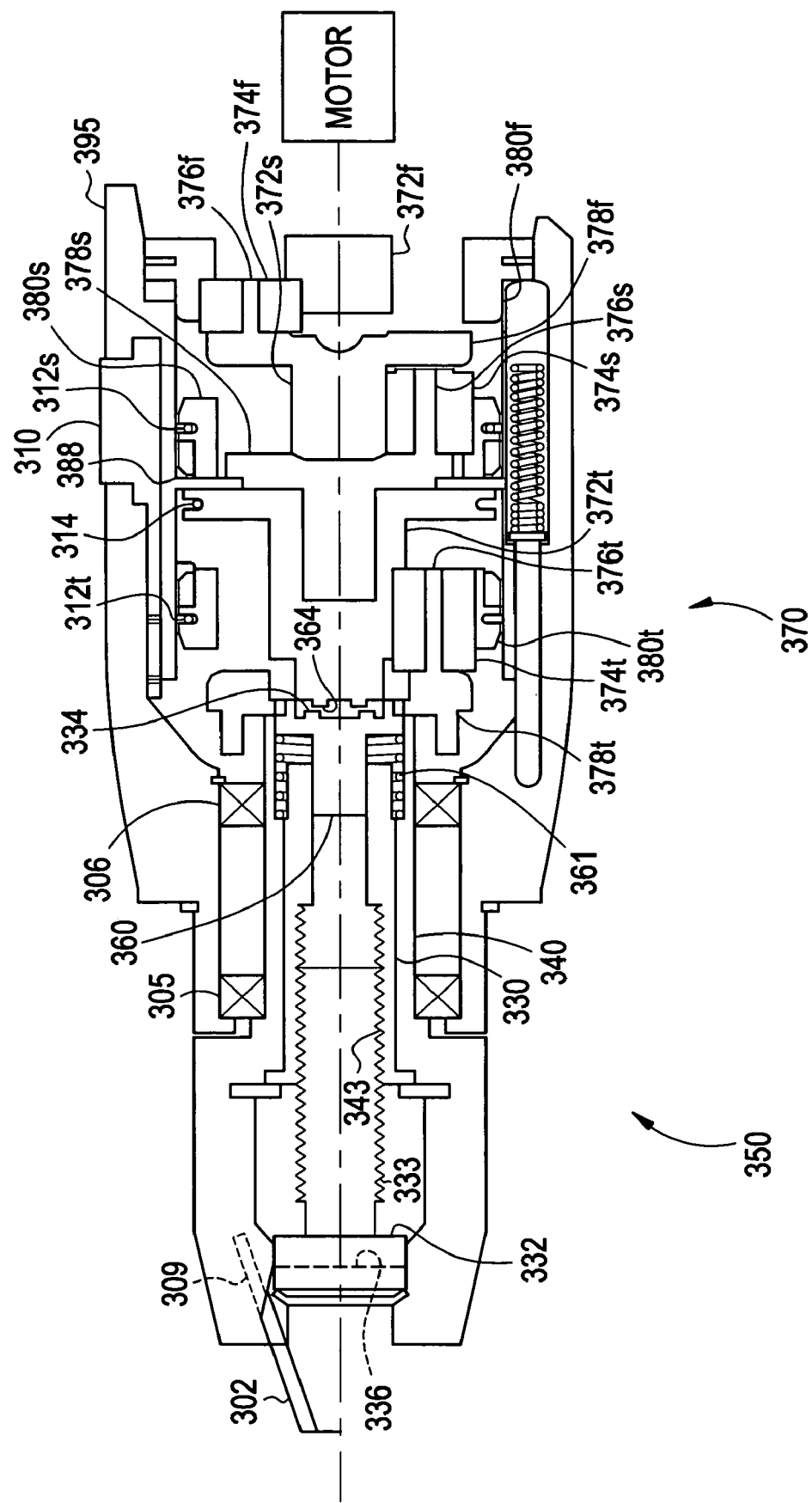
FIGS. 7 and 8 are schematic illustrations of a tool chuck with a power take off feature according to another example, non-limiting embodiment of the present invention.
Figure 8:
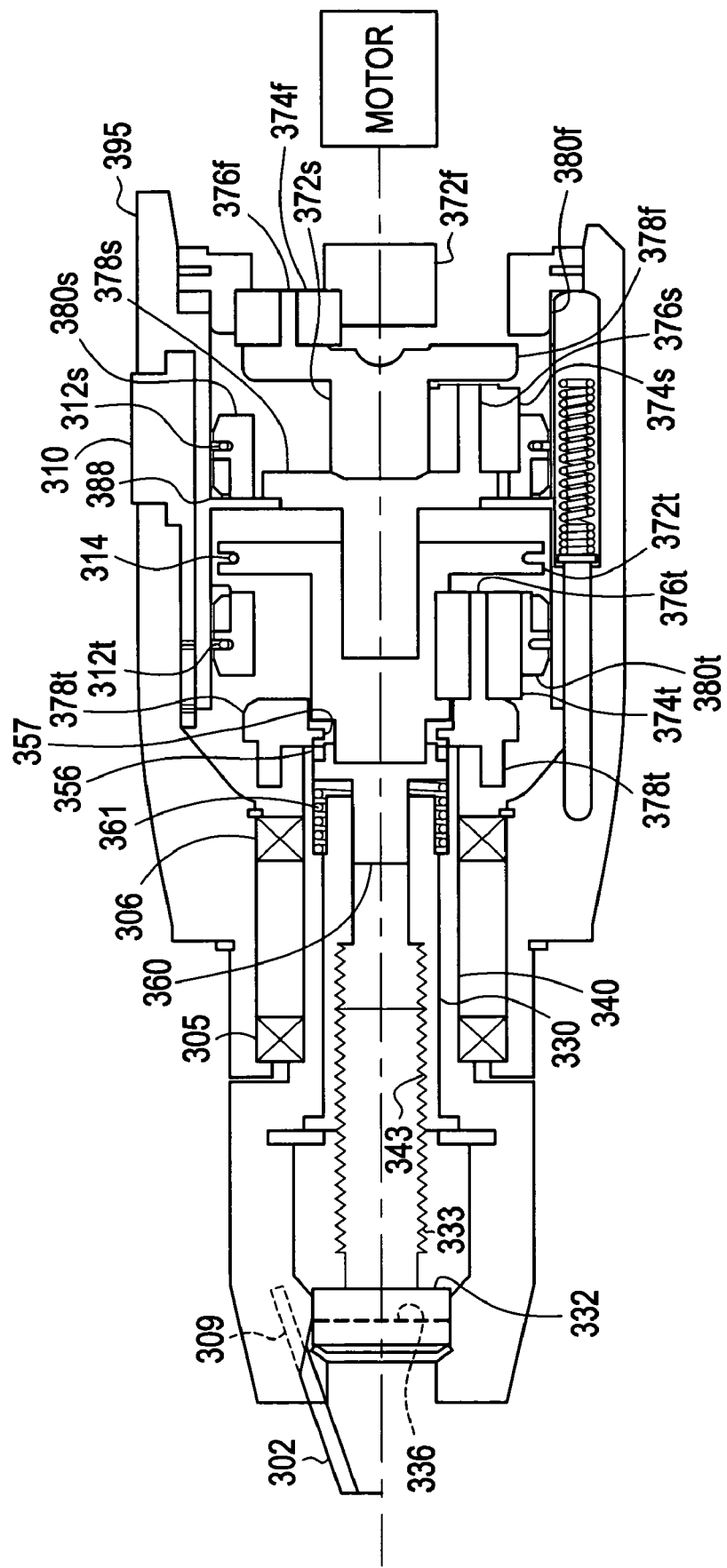

FIGS. 7 and 8 shows another example, non-limiting embodiment of a tool chuck 350 with a power take off feature.

This example embodiment is similar to the previous example embodiments to the extent that it includes a power take off feature. However, in this example embodiment, the second stage carrier and the third stage sun gear may be axially moveable with respect to each other.

A. The Structure:

With reference to FIG. 7, the tool chuck 350 may be connected to the transmission 370 of a power driver. The transmission 370 may couple an electric motor to the tool chuck 350.

As in the previous embodiments, the transmission 370 may include three planetary reduction systems, but the invention is not limited in this regard. FIG. 7 depicts all three planetary reduction systems inclusive of a first stage reduction system, a second stage, reduction system, and a third stage reduction system.

The first stage reduction system may include a first stage sun gear 372$f$ fixed to a rotary shaft of the electric motor. A plurality of first stage planetary gears 374$f$ may engage with the first stage sun gear 372$f$. Each first stage planetary gear 374$f$ may be rotatably mounted on a respective shaft 376$f$ that is supported by a first stage carrier 378$f$. A first stage ring gear 380$f$ may engage with the first stage planetary gears 374$f$. The first stage ring gear 380$f$ may be axially fixed to the housing 395 of the driver.

The second stage reduction system may include a second stage sun gear 372$s$ fixed on the front side of the first stage carrier 378$f$. A plurality of second stage planetary gears 374$s$ may engage with the second stage sun gear 372$s$. Each second stage planetary gear 374$s$ may be rotatably mounted on a respective shaft 376$s$ that is supported by a second stage carrier 378$s$. The second stage carrier 378$s$ may be axially fixed to the housing 395 via a retaining plate 388. A second stage ring gear 380$s$ may engage with the third stage planetary gears 374$s$.

The third stage reduction system may include a third stage sun gear 372$t$ provided on the front side of the second stage carrier 378$s$. Here, the third stage sun gear 372$t$ and the second stage carrier 378$s$ may be rotationally fixed together and axially moveable relative to each other. By way of example only, and not as a limitation of the invention, the third stage sun gear 372$t$ may include a longitudinal spline that is received by a cooperating feature provided on the second stage carrier 378$s$. It will be appreciated that numerous and varied couplings of this type may be suitably implemented as is well known in this art. A plurality of third stage planetary gears 374$t$ may engage with the third stage sun gear 372$t$. Each third stage planetary gear 374$t$ may be rotatably mounted on a respective shaft 376$t$ that is supported by a third stage carrier 378$t$. A third stage ring gear 380$t$ may engage with the third stage planetary gears 374$t$.

In this example embodiment, the second stage ring gear 380$s$ and the third stage ring gear 380$t$ may be axially moveable to selectively operate the corresponding planetary reduction systems, while the first stage reduction system may remain operative. To this end, the ring gears 380$s$ and 380$t$ may be provided with continuous, circumferential grooves in which respective wires 312$s$ and 312$t$ may be provided. The wires 312$s$ and 312$t$ may be slidable through the respective grooves. The ends of the wires 312$s$ and 312$t$, which may serve as cam followers, may extend out of the grooves and be received by respective slots of the shift collar 310. Upon rotating the shift collar 310 relative to the housing-395, the slots may influence the wires 312$s$ and 312$t$ (and thus the corresponding ring gears) to the desired axial positions.

As shown in FIGS. 7 and 8, all three planetary reduction systems are operative. From the relative positions illustrated in FIGS. 7 and 8, the second stage ring gear 380$s$ may be moved to an axial reward position to make the second stage reduction inoperative. Also, the third stage ring gear 380$t$ may be moved to an axial forward position to make the third stage reduction inoperative.

Power may be taken off the transmission 370 via the third stage carrier 378$t$. To this end, the third stage carrier 378$t$ and an input shaft 340 may be rotationally fixed together so that transmission power may be delivered for rotationally driving the tool chuck 350 (in both a normal operating mode and a chuck actuating mode).

Power may also be taken off the transmission 370 via the third stage sun gear 372$t$. To this end, the third stage sun gear 372$t$ may have a front surface provided with drive lugs 364. Also, the third stage sun gear 372$t$ may be axially moveable relative to the housing 395 (and thus the second stage carrier 378$s$ by virtue of the retaining plate 388) between a forward position and a rearward position.

When the third stage sun gear 372$t$ is in the axial forward position (as shown in FIG. 8), the drive lugs 364 may interact with lugs 334 provided on a chuck drive coupling 360. In this condition, the third stage sun gear 372$t$ and the chuck drive coupling 360 may be rotationally fixed together so that transmission power may be delivered for actuating the tool chuck 350 (in the chuck actuating mode). When the third stage sun gear 372$t$ is in the axial rearward position (as shown in FIG. 7), the drive lugs 364 may disengage the chuck drive coupling 360. In this condition, the third stage sun gear 372$t$ and the chuck drive coupling 360 may rotate relative to each other (in the normal operating mode).

An outer surface of the third stage sun gear 372$t$ may be provided with a continuous, circumferential groove in which a wire 314 may be provided. The wire 314, which may be slidable through the circumferential groove, may have free ends that extend in a radial direction and out of the circumferential groove. The free ends of the wire 314 may be received in a slot of the shift collar 310. Upon rotating the shift collar 310, the slot may influence the wire 314 (and thus the third stage sun gear 372$t$) to the desired axial position.

The input shaft 340 may be mounted for rotation (via bearings 305 and 306) in the housing 395. The forward end of the input shaft 340 may include inclined passageways 309 through which chuck jaws 302 are respectively slidable. The inclined passageways 309 may rotationally fix the input shaft 340 to the chuck jaws 302. The input shaft 340 may include a bore through which a chuck actuating shaft 330 extends. The input shaft 340 and the chuck actuating shaft 330 may be axially fixed together and rotatable relative to each other.

The chuck actuating shaft 330 may have radially inward facing threads 343 that interact with radially outward facing threads 333 of a chuck actuating screw 332. The rear end of the chuck actuating shaft 330 may support the chuck drive coupling 360. The chuck actuating shaft 330 and the chuck drive coupling 360 may be rotationally fixed together and axially moveable with respect to each other. By way of example only, and not as a limitation of the invention, the chuck actuating shaft 330 may include a longitudinal spline that is received by a cooperating feature provided on the chuck drive coupling 360.

A compression spring 361 may be captured between the input shaft 340 and the chuck drive coupling 360. The compression spring 361 may influence the chuck drive coupling 361 into engagement with the third stage carrier 378$t$, as shown in FIG. 7. In this condition, the chuck drive coupling 360 may be rotationally fixed to the third stage carrier 378$t$ via cooperating features (not shown). However, and with reference to FIG. 8, the chuck drive coupling 360 may be driven against the bias of the compression spring 361 to an axial forward position (via an axial forward movement of the third stage sun gear 372t). Here, the cooperating features may disengage so that the chuck drive coupling 360 and the third stage carrier 378t may be rotatable relative to each other. By way of example only, and not as a limitation of the invention, the cooperating features may include a set of radially outward facing teeth 356 provided on the chuck drive coupling 360 and a corresponding set of radially inward facing teeth 357 provided on the third stage carrier 378t.

The chuck actuating screw 332 may be advanced or retracted in the axial direction relative to the chuck actuating shaft 330 (and thus the input shaft 340) due to the interaction of the threads 333, 343. The forward end of the chuck actuating screw 332 may include radially oriented passageways 336 in which the chuck jaws 302 are respectively supported. The radially oriented passageways 336 may guide a radial movement of the chuck jaws 302, and at the same time may rotationally fix the chuck jaws 302 to the chuck actuating screw 332.

B. The Operation:

The tool chuck 350 may operate in the normal operating mode when the third stage sun gear 372t is in the axial rearward position, and in the chuck actuating mode when the third stage sun gear 372t is in the axial forward position. During both modes, the second stage carrier 378s may remain at the same axial position relative to the housing 395 by virtue of the retaining plate 388.

During the normal operating mode, i.e., when the third stage sun gear 372t is in the axial rearward position illustrated in FIG. 7 and when the driver is powered up, the third stage carrier 378t may rotationally drive the input shaft 340 and the chuck drive coupling 360 (via the cooperating features 356, 357). At this time, the third stage sun gear 372t and the chuck drive coupling 360 may rotate relative to each other and relative to the housing 395.

The input shaft 340 may rotate together with the chuck jaws 302, which may in turn rotationally drive the chuck actuating screw 332. The chuck actuating screw 332 and the chuck actuating shaft 330 (which may be rotationally fixed to the chuck drive coupling 360) may rotate together with the input shaft 340. Thus, the input shaft 340, the chuck jaws 302, the chuck actuating screw 332, the chuck actuating shaft 330, and the chuck drive coupling 360 may rotate together as a unit relative to the housing 395. In the condition shown in FIG. 7, the third stage carrier 378t, the input shaft 340, and the chuck drive coupling 360 may be rotationally fixed together and this may effectively lock the tool chuck 350 and prevent loosening of the tool chuck during the normal operating mode.

During the chuck actuating mode, i.e., when the third stage sun gear 372t is in the axial forward position illustrated in FIG. 8 and when the driver is powered up, the third stage carrier 378t may rotate together with the input shaft 340, the chuck jaws 302, and the chuck actuating screw 332. At the same time, the drive lugs 364 of the third stage sun gear 372t may rotationally drive the chuck drive coupling 360 (via the lugs 334) and thus the chuck actuating shaft 330. As shown in FIG. 8, the chuck drive coupling 360 (and the teeth 356) may be disengaged from the third stage carrier 378t (and the teeth 357) so that these component parts may be rotatable relative to each other.

When the third stage reduction is operative (as shown in FIGS. 7 and 8), one rotation of the third stage sun gear 372t may cause only a fractional rotation of the third stage carrier 378t. In other words, relative to the housing 395, the third stage sun gear 372t (and thus the chuck drive coupling 360 and the chuck actuating shaft 330) may rotate faster than the third stage carrier 378t (and thus the chuck actuating screw 332). This speed differential may cause the chuck actuating screw 332 to advance or retract in the axial direction by virtue of the interaction between the radially inward facing threads 343 and the radially outward facing threads 333.

The translational movement of the chuck actuating screw 332 relative to the chuck actuating shaft 330 (and the input shaft 340) may push or pull on the chuck jaws 302, thereby opening and/or closing the same. For example, during a closing operation, the chuck actuating screw 332 (together with the chuck jaws 302) may be advanced in the axial direction. During this time, the inclined passageways 309 of the input shaft 340 may influence the chuck jaws 302 in a radial inward direction through the radially oriented passageways 336 of the chuck actuating screw 332.

VI. Example Embodiment of a Shift Collar—FIG. 9

Figure 9:
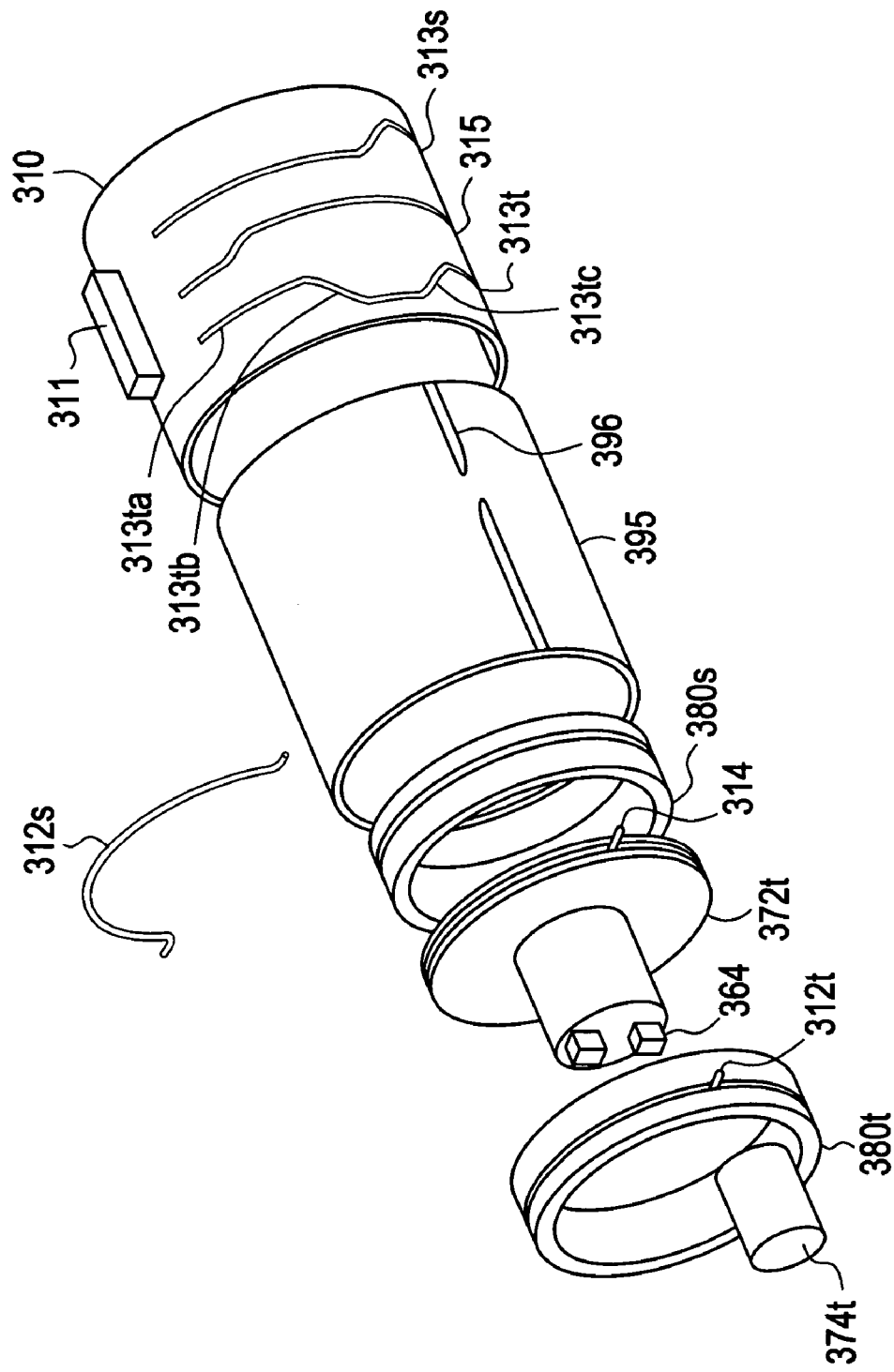
FIG. 9 is an exploded perspective view of a shift collar that may be implemented to shift operating modes of the example tool chuck depicted in FIGS. 7 and 8.

FIG. 9 shows an example, non-limiting embodiment of a shift collar 310 that may be implemented to axially position the various components of the transmission 370 depicted in FIGS. 7 and 8. That is, the shift collar 310 may be actuated to axially position the second and the third stage ring gears 380s, 380t, respectively, and the third stage sun gear 372t. It will be appreciated, however, that the shift collar 310 may be suitably implemented in numerous and varied embodiments. For example, the shift collar 310 may be implemented to axially position ring gears, as well as the third stage carrier 78t of FIG. 1, the third stage carrier 78t' of FIG. 2, the third stage sun gear 172t together with the second stage carrier 178s of FIG. 4, and the third stage sun gear 272t together with the second stage carrier 278s of FIG. 6.

A. The Structure:

With reference to FIG. 9, the shift collar 310 may have a hollow, cylindrical shape. The shift collar 310 may be mounted on the housing 395 to be axially fixed to the housing 395 and rotatable relative to the housing 395. The shift collar 310 may include a protrusion 311 that may be manipulated by a user.

The shift collar 310 may also include slots that extend in a circumferential direction around the shift collar 310. In this example embodiment, three slots 313s, 313t, 315 may be provided. The number of slots may correspond to the number of transmission elements that may be axially displaceable. However, the invention is not limited in this regard to the extent that more or fewer slots may be provided.

The housing 395 may have a hollow cylindrical shape and extend through the shift collar 310. To facilitate understanding, only a portion of the housing 395 is illustrated. Other portions of the housing 395 may cover the exterior of the shift collar 310, and a window may be provided in the housing to give a user access to the protrusion 311.

The housing 395 may also include longitudinal slots 396. In this example embodiment, the longitudinal slots 396 may be diametrically opposed to each other, but the invention is not limited in this regard. As shown, the longitudinal slots 396 may be discontinuously provided along the length of the housing 395. The longitudinal slots 396 may extend across (and underneath) the slots 313s, 313t, 315 of the shift collar 310.

The second and the third stage ring gears 380s, 380t and the third stage sun gear 372t may be provided with continuous, circumferential grooves in which respective wires 312s, 312t, 314 may be provided. The wires may be slidable through the corresponding circumferential grooves. Each of the wires 312s, 312t, 314 may have ends that extend in a radial direction and out of the corresponding groove. The ends of each wire may extend through the longitudinal slots 396 of the housing 395 and into a corresponding slot of the shift collar 310. In this example embodiment, the ends of the wire 312s may extend into the slot 313s of the shift collar 310, the ends of the wire 314 may extend into the slot 315 of the shift collar 310, and the ends of the wire 312t may extend into the slot 313t of the shift collar 310.

B. The Operation:

The user may rotate the shift collar 310 (via the protrusion 311) relative to the housing 395 and the wires 312s, 312t, 314, which may remain rotationally fixed to the housing 395 via the longitudinal slots 396. During this relative rotation, the ends of the wires 312s, 312t, 314 may respectively slide through the slots 313s, 313t, 315 of the shift collar 310.

The shape of each slot 313s, 313t, 315 may influence the corresponding wire 312s, 312t, 314, respectively, to a desired axial position. In this regard, the ends of the each wire may serve as a cam follower and the corresponding slot may serve as a cam. The longitudinal slots 396 of the housing 395 may guide the axial movements of the wires 312s, 312t, 314. The wires 312s, 312t, 314 may move axially together with the second stage ring gear 380s, the third stage ring gear 380t, and the third stage sun gear 372t, respectively.

When the shift collar 310 rotates, a given transmission element may remain in the same axial position or move in an axial direction (forward or rearward) depending on the shape of the corresponding slot of the shift collar 310. Consider the slot 313t depicted in FIG. 9. Here, the section 313ta of the slot 313t may extend in a circumferential direction only. This slot section 313ta may not cause any axial displacement of the third stage ring gear 380t. The next section 313tb of the slot 313t may extend in an axial forward direction. This slot section 313tb may cause the third stage ring gear 380t to move in an axial forward direction. And the next section 313tc of the slot 313t may extend in an axial rearward direction. This slot section 313tc may cause the third stage ring gear 380t to move in an axial rearward direction.

When the driver is powered up, a wire may slide through the continuous, circumferential groove of the corresponding transmission element. For example, the wire 314 (which may remain rotationally fixed to the housing 395) may slide through the groove of the third stage sun gear 372t. Also, if a planetary reduction system is inoperative, then the corresponding wire (which may remain rotationally fixed to the housing 395) may slide through the groove of the corresponding ring gear.

C. Modification for Clutch Pin—FIGS. 10 and 11:

Some power drivers may include a clutch mechanism. Clutch mechanisms are well known in this art, and therefore a detailed discussion of the same is omitted. Conventionally, the clutch mechanism may include a clutch pin mounted on an outward facing surface of the housing. This outboard mounting location may limit the travel of the shift collar relative to the housing. It may be desirable to avoid such limited travel, especially for implementations in which the shift collar may be used to select another setting like the chuck actuating mode described above, for example.

Figure 11:
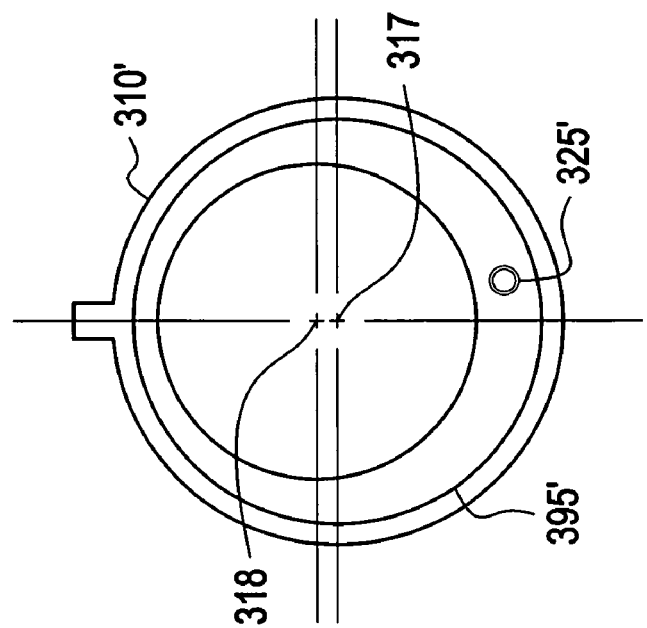
FIGS. 10 and 11 are schematic illustrations of another example shift collar.
Figure 10:
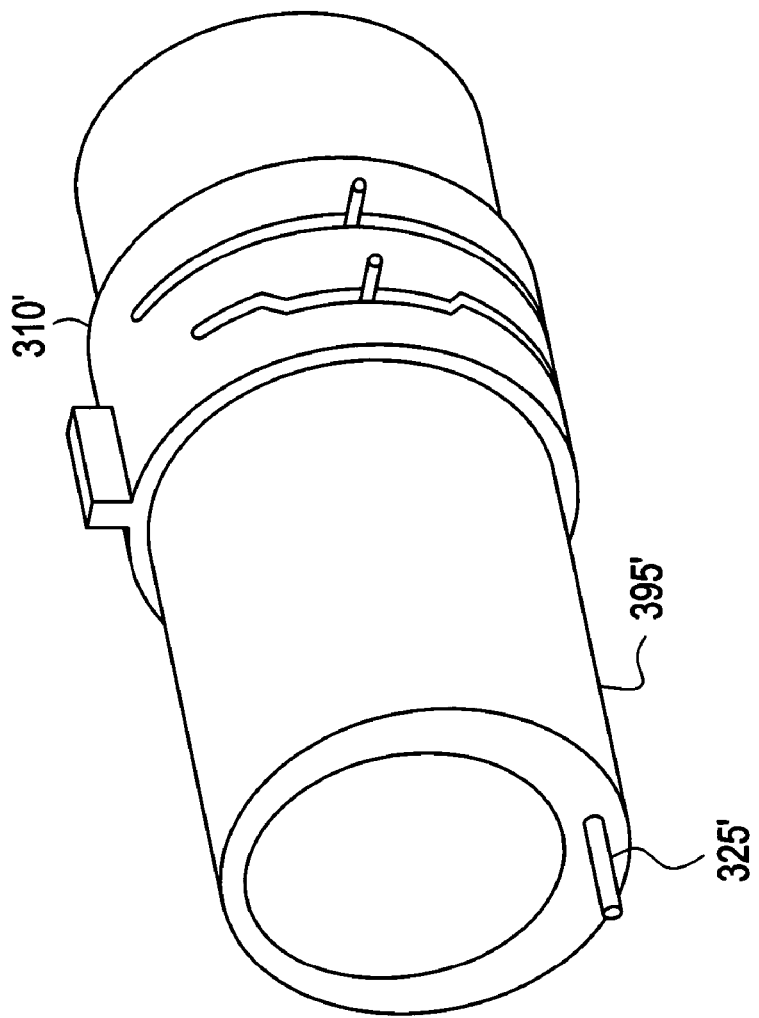

In the example embodiment depicted in FIGS. 10 and 11, the center 317 of the shift collar 310' may be eccentric to the center 318 of the housing 395'. In this arrangement, the clutch pin 325' may extend parallel to the rotational axis of the power driver. The clutch pin 325' may also extend through a side wall of the housing 395' that extends through the shift collar 310'. In this regard, the clutch pin 325' may be located radially inward of the shift collar 310', and therefore may not limit the travel of the shift collar 310'.

Figure 12:
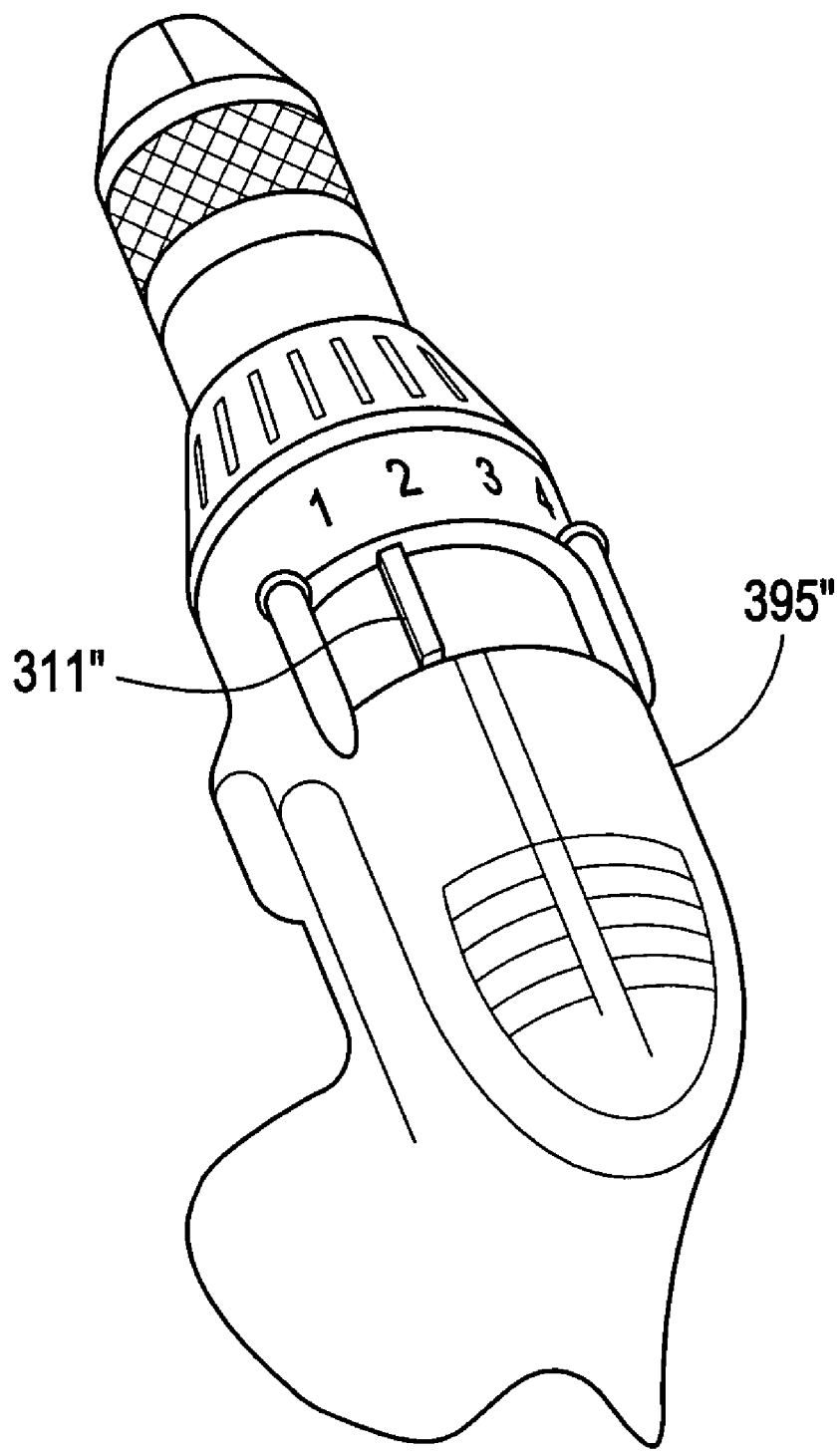
FIG. 12 is a partial perspective view of another example shift collar.

D. Modification for Powering Up the Driver—FIG. 12:

FIG. 12 illustrates the exterior of a power driver. Here, the housing 395" of the power driver may include a window. The protrusion 311" of the shift collar may remain exposed through the window, thereby giving a user access to the protrusion 311". The protrusion may be moved to any of four positions 1, 2, 3, 4. The invention is not, however, limited in this regard.

The positions 2 and 3 may be selected to operate the driver in normal operating modes that may be associated with corresponding gear reductions. In this regard, the positions 2 and 3 may be selected to operate the driver at two different speeds. When either one of these two positions is selected, the user may squeeze a trigger (which is hidden from view in FIG. 12) to power up the driver.

The positions 1 and 4 may be selected to operate the driver in chuck actuating modes. For example, position 1 may be selected to tighten the chuck jaws and position 4 may be selected to loosen the chuck jaws. The positions 1 and 4 may be spring loaded. In this case, the user may press and hold the protrusion 311" in either of the two positions 1 and 4. When the user releases the protrusion 311", the protrusion 311" may automatically move to a normal operation position.

The shift collar may be operatively connected to a switch for powering up the driver. On the one hand, when the protrusion 311" is pressed and held in either position 1 or 4, the switch may be actuated to power up the driver. On the other hand, when the protrusion 311" is in either position 2 or 3, the switch may remain open so as not to power up the driver.

The example shift collar depicted in FIG. 12 may operate as follows. The user may insert an accessory into the tool chuck, and slide the protrusion 311" to position 1. As the user holds the protrusion 311" in position 1, the driver may be powered up (without the user having to squeeze the trigger) and transmission power may be delivered to the tool chuck to tighten the chuck jaws onto the accessory.

Once the accessory is locked in the chuck jaws, the user may release the protrusion 311", which may then automatically return to position 2 (which is associated with a normal operating mode). The user may operate the driver (and accessory) in a normal operating mode by simply squeezing the trigger, and without having to shift the protrusion 311". The accessory could be released from the tool chuck by holding the protrusion 311" at the position 4.

Numerous and varied modifications of the shift collar positions (and the associated functionalities) may be readily apparent to those skilled in the art. For example, the positions 1, 2, 3 may be selected to operate the driver in normal operating modes and at three distinct speeds, respectively. Position 4 may be selected to operate the driver in chuck actuating modes. Here, to tighten or loosen the tool chuck, a user may move the shift collar protrusion to position 4. A chuck icon may be embossed on the housing rather than a number (to be user friendly). The user may then squeeze the trigger to power up the driver. If the driver is set to run in a forward direction (via a conventional direction switch) then the tool chuck may be tightened. If the driver is set to run in a reverse direction (via the direction switch), then the tool chuck may be loosened.

IV. Example Embodiment Depicted in FIGS. 13 and 14

Figure 13:
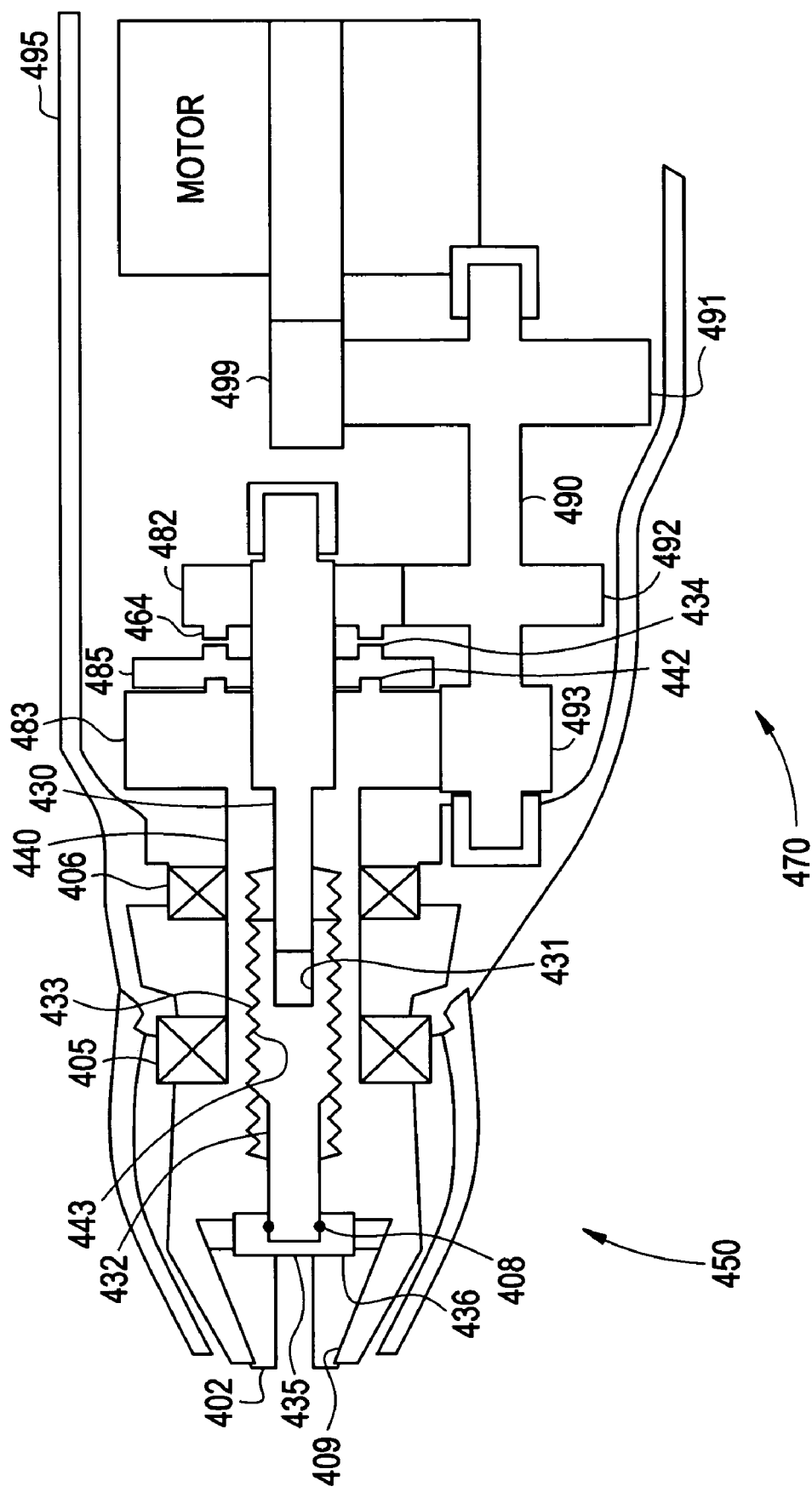
FIGS. 13 and 14 are schematic illustrations of a tool chuck with a power take off feature according to another example, non-limiting embodiment of the present invention.
Figure 14:
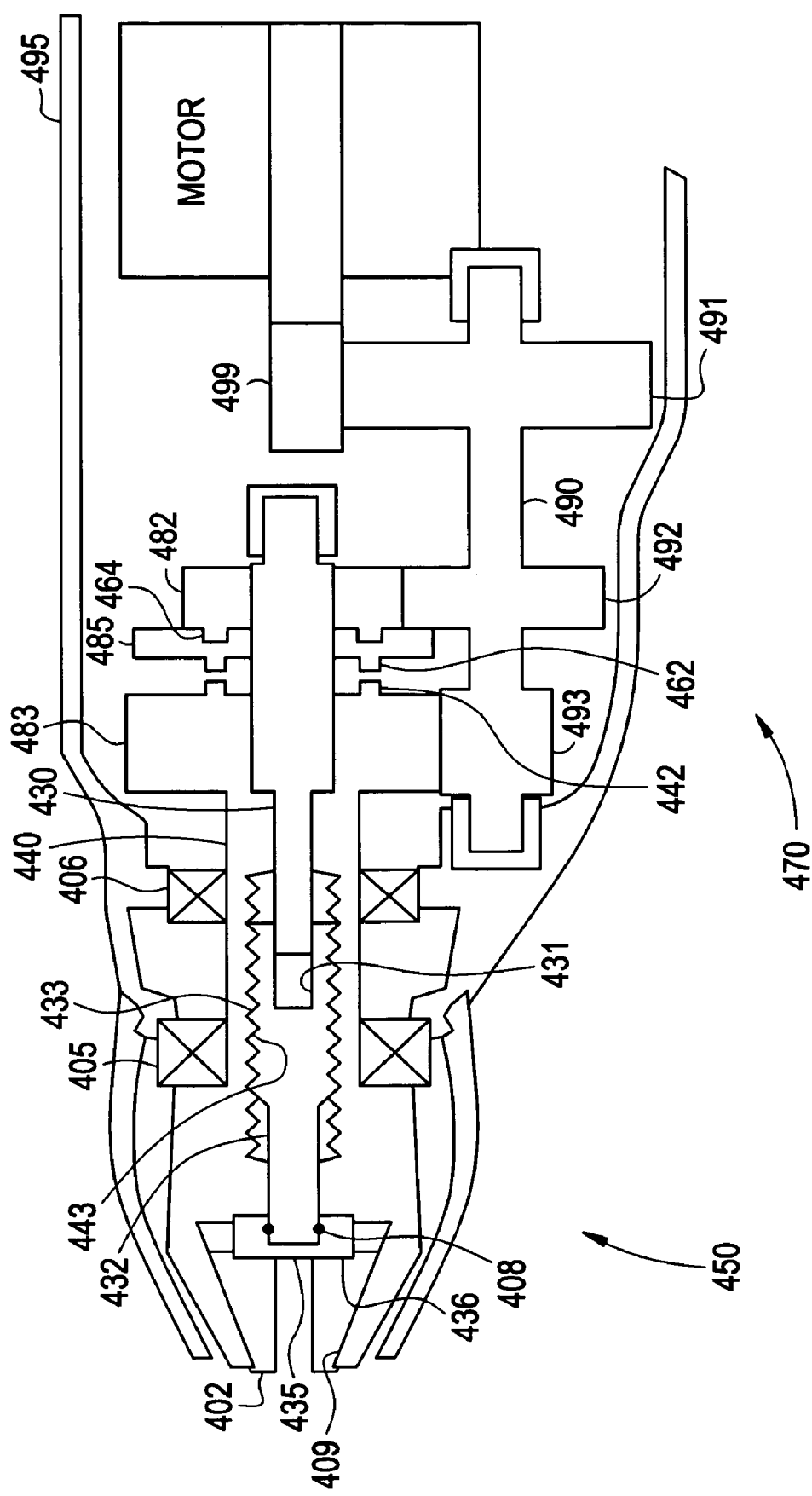

FIGS. 13 and 14 show another example, non-limiting embodiment of a tool chuck 450 with a power take off feature. The tool chuck 450 may be connected to a parallel axis transmission 470. Parallel axis transmissions may be typically implemented in corded drills and drivers, but the invention is not limited in this regard.

A. The Structure:

With reference to FIG. 13, the parallel axis transmission 470 may couple an electric motor to the tool chuck 450. The electric motor may have a rotary shaft that supports an output gear 499. The output gear 499 may engage with and rotationally drive an intermediate shaft 490.

The intermediate shaft 490 may be mounted for rotation in the housing 495 of the driver. The intermediate shaft 490 may support an input gear 491, a chuck actuating drive gear 492, and an input shaft driver gear 493. The input gear 491 may engage with the output gear 799, the chuck actuating drive gear 492 may engage with a chuck actuating driven gear 482, and the input shaft drive gear 493 may engage with an input shaft driven gear 483.

Power may be taken off the transmission 470 via the input shaft drive gear 493 in both a normal operating mode and a chuck actuating mode. Power may also be taken off the transmission 470 via the chuck actuating drive gear 492 in a chuck actuating mode. As will be discussed in greater detail below, the mode of the driver may be selected by moving a shift plate 485 between an axial forward position (as shown in FIG. 13) and axial rearward position (as shown in FIG. 14). The shift plate 485 may be moved to the desired axial position via a shift collar, as discussed above.

An input shaft 440 may be mounted for rotation (via bearings 405, 406) in the housing 495. The rear end of the input shaft 440 may be fixed to the input shaft driven gear 483. The input shaft driven gear 483 may have a rear surface provided with lugs 442. The forward end of the input shaft 440 may include inclined passageways 409 through which chuck jaws 402 are respectively slidable. The inclined passageways 409 may rotationally fix the input shaft 440 to the chuck jaws 402. The input shaft 440 may include a bore having radially inward facing threads 443 that interact with radially outward facing threads 433 of a chuck actuating screw 432.

The chuck actuating screw 432 may be supported by the input shaft 440. The interaction of the threads 433, 443 may cause the chuck actuating screw 432 to advance or retract in the axial direction relative to the input shaft 440. A rear end of the chuck actuating screw 432 may include a blind hole 431 that receives the forward end of a chuck actuating shaft 430. The chuck actuating screw 432 and the chuck actuating shaft 430 may be rotationally fixed together and the chuck actuating screw 432 may be axially moveable relative to the chuck actuating shaft 430.

The rear end of the chuck actuating shaft 430 may support the chuck actuating driven gear 482 and the shift plate 485. The chuck actuating driven gear 482 may be mounted on the chuck actuating shaft 430 so that the two component parts may be rotatable relative to each other and axially fixed together. The chuck actuating driven gear 482 may have a front surface provided with drive lugs 464.

The shift plate 485 may be mounted on the chuck actuating shaft 430 so that the two component parts may be rotationally fixed together and axially moveable relative to each other. The shift plate 485 may have a rear surface provided with lugs 434 (see FIG. 13) and a front surface provided with lugs 462 (see FIG. 14). When the shift plate 485 is in the axial forward position, as shown in FIG. 13, the lugs 462 may interact with the lugs 442 so that the shift plate 485 and the input shaft driven gear 483 may be rotationally fixed together. And when the shift plate 485 is in the axial rearward position, as shown in FIG. 14, the lugs 434 may interact with the lugs 464 so that the shift plate 485 and chuck actuating driven gear 482 may be rotationally fixed together.

A pusher head 435 may be mounted for rotation on the forward end of the chuck actuating screw 432. A bearing 408 may be provided to facilitate the relative rotation between the pusher head 435 and the chuck actuating screw 432. The pusher head 435 may include radially oriented passageways 436 in which the chuck jaws 402 are respectively supported. The radially oriented passageways 436 may guide a radial movement of the chuck jaws 402, and at the same time may rotationally fix the chuck jaws 402 to the pusher head 435.

B. The Operation:

The tool chuck 450 may operate in the normal operating mode when the shift plate 485 is in the axial forward position, and in the chuck actuating mode when the shift plate 485 is in the axial rearward position.

During the normal operating mode, i.e., when the shift plate 485 is in the axial forward position illustrated in FIG. 13 and when the driver is powered up, the input shaft drive gear 493 may rotationally drive the input shaft driven gear 483. Here, the shift plate 485 (and thus the chuck actuating shaft 430) may rotate together with the input shaft 440 due to the interacting lugs 442, 462. That is, the interacting lugs 442, 462 may rotationally lock the input shaft 440 to the chuck actuating shaft 430 and this may prevent the tool chuck 450 from loosening during the normal operating mode. In this condition, the chuck actuating shaft 430 and the chuck actuating driven gear 482 may rotate relative to each other and relative to the housing 495.

The input shaft 440 may rotate together with the chuck jaws 402, which may in turn rotationally drive the pusher head 435. The chuck actuating screw 432 and the chuck actuating shaft 430 may rotate together with the input shaft 440. Thus, the input shaft 440, the chuck jaws 402, the pusher head 435, the chuck actuating screw 432, and the chuck actuating shaft 430 may rotate together as a unit relative to the housing 495.

During the chuck actuating mode, i.e., when the shift plate 485 is in the axial rearward position illustrated in FIG. 14 and when the driver is powered up, the input shaft drive gear 493 may rotationally drive the input shaft driven gear 483. The input shaft 440 may rotate together with the chuck jaws 402 and the pusher head 435. At the same time, the chuck actuating drive gear 492 may rotationally drive the chuck actuating driven gear 482. The shift plate 485 (and thus the chuck actuating shaft 430) may rotate together with the chuck actuating driven gear 482 due to the interacting lugs 434, 464.

The chuck actuating drive gear 492 may be larger than the input shaft drive gear 493, and thus the chuck actuating driven gear 482 may be driven at a faster rotational speed than the input shaft driven gear 483. As a result, relative to the housing 495, the chuck actuating shaft 430 (and thus the chuck actuating screw 432) may rotate faster than the input shaft 440. This speed differential may cause the chuck actuating screw 432 to advance or retract in the axial direction by virtue of the interaction between the radially inward facing threads 443 and the radially outward facing threads 433. The translational movement of the chuck actuating screw 432 may push or pull on the pusher head 435.

The pusher head 435 may remain rotationally fixed to the input shaft 440 (via the chuck jaws 402 being situated in the radial passageways 436 and the inclined passageways 409). Thus, the chuck actuating screw 432 may rotate relative to the pusher head 435. The translational movement of the pusher head 435 may push or pull on the chuck jaws 402, thereby opening and/or closing the same.

In this example embodiment, the chuck actuating drive gear 492 may be larger than the input shaft drive gear 493 so that the chuck actuating driven gear 482 may be driven at a faster rotational speed than the input shaft driven gear 483. However, the invention is not limited in this regard. For example, the chuck actuating drive gear 492 may be smaller than the input shaft drive gear 493 so that the chuck actuating driven gear 482 may be driven at a slower rotational speed than the input shaft driven gear 483. This configuration may be advantageous with respect to chuck holding performance.

VIII. Example Embodiment Depicted in FIGS. 15-18

FIGS. 15-18 show another example, non-limiting embodiment of a tool chuck 550 with a power take off feature. The tool chuck 550 may be connected to a parallel axis transmission 570. Here, the chuck actuating mode may be achieved by rotationally locking the chuck actuating shaft to the housing of the driver.

Figure 15:
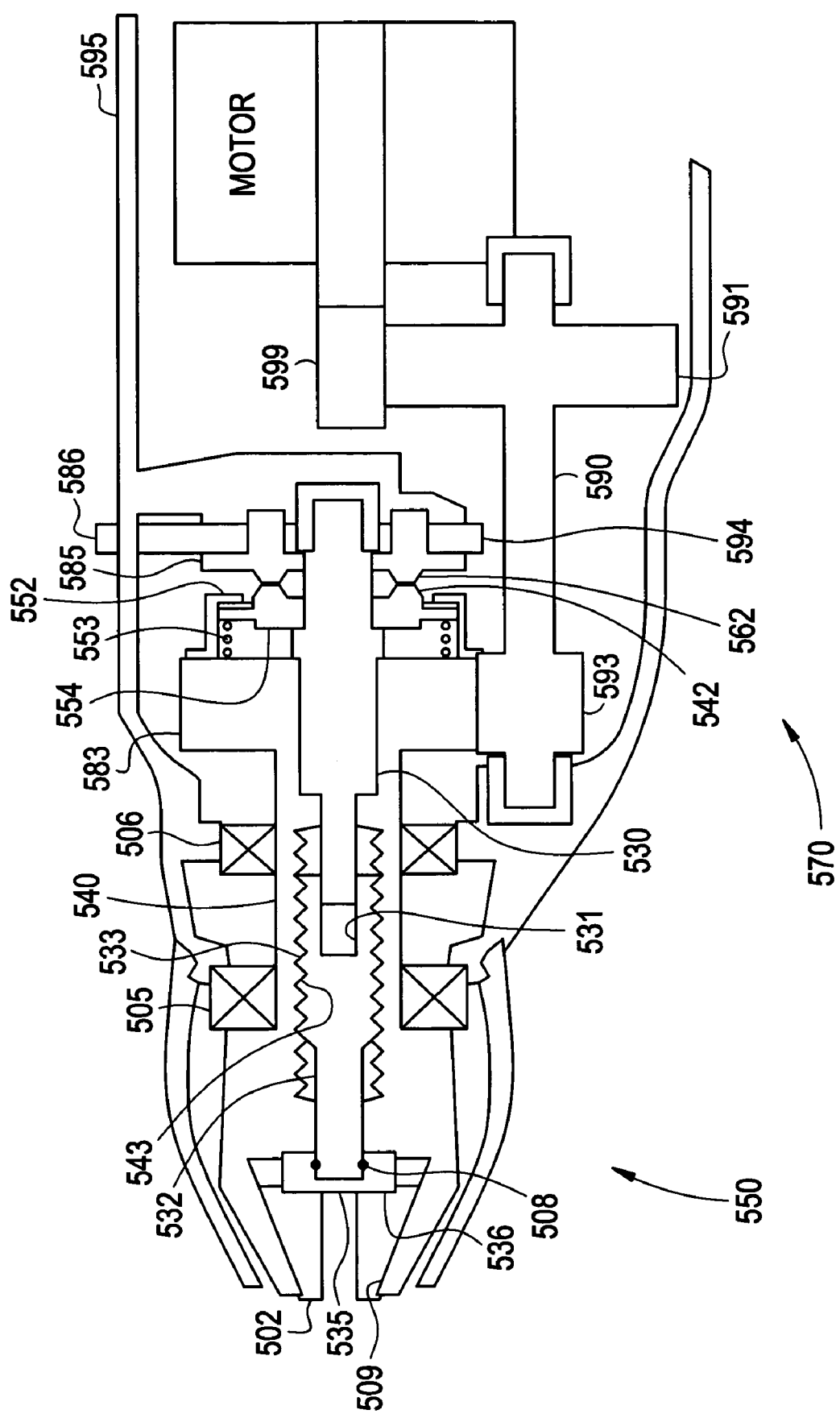
FIGS. 15-18 are schematic illustrations of a tool chuck with a power take off feature according, to another example, non-limiting embodiment of the present invention.

The Structure:

With reference to FIG. 15, the parallel axis transmission 570 may couple an electric motor to the tool chuck 550. The electric motor may have a rotary shaft that supports an output gear 599. The output gear 599 may engage with and rotationally drive an intermediate shaft 590.

The intermediate shaft, 590 may be mounted for rotation in the housing 595 of the driver. The intermediate shaft 590 may support an input gear 591 and an input shaft drive gear 593. The input gear 591 may engage with the output gear 599, and the input shaft drive gear 593 may engage with an input shaft driven gear 583.

Figure 16:
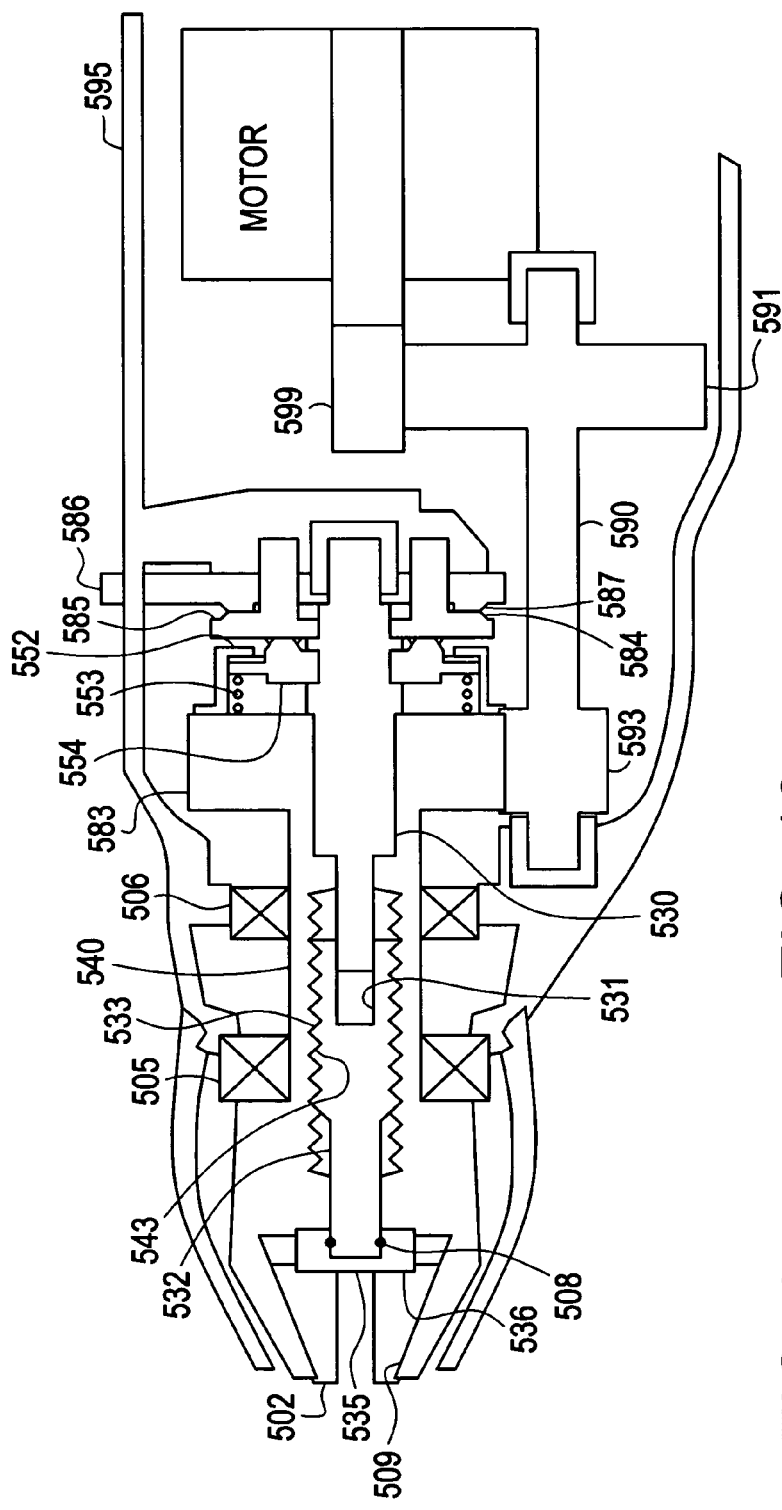

Power may be taken off the transmission 570 via the input shaft drive gear 593 in both a normal operating mode and a chuck actuating mode. As will be discussed in greater detail below, the mode of the driver may be selected by moving a shift plate 585 between an axial rearward position (as shown in FIG. 15) and an axial forward position (as shown in FIG. 16). The shift plate 585 may be moved to the desired axial position via a shifter 586.

For example, a user may move a protrusion of the shifter 586 laterally (i.e., perpendicular to the plane of the drawing sheet). This lateral movement of the protrusion may cause the shifter 586 to rotate about the axis of the chuck actuating shaft 530. With reference to FIG. 16, the shifter 586 may have a forward facing surface provided with rotary cam surfaces 587. The rotary cam surfaces 587 may interact with rotary cam surfaces 584 on the rearward facing surface of a shift plate 585. When the shifter 586 is rotated, the rotary cam surfaces 584, 587 may cause the shift plate 585 to move forward with enough force to compress a compression spring 553 so that the shift plate 585 may engage with a lock plate 554, as shown in FIG. 16. And when the shifter 586 is rotated in the opposite direction, the shift plate 585 may move (under the influence of the compression spring 553) in the rearward direction and out of engagement with the lock plate 554, as shown in FIG. 15. The shift plate 585 may remain rotationally fixed to the housing 595.

An input shaft 540 may be mounted for rotation (via bearings 505, 506) in the housing 595. The rear end of the input shaft 540 may be fixed to the input shaft driven gear 583. The input shaft driven gear 583 may have a rear surface provided with an, assembly inclusive of a retainer 552 and a lock plate 554. A compression spring 553 may be captured between the input shaft driven gear 583 and the lock plate 554 to influence the lock plate 554 in an axial rearward direction and against the retainer 552.

The forward end of the input shaft 540 may include inclined passageways 509 through which chuck jaws 502 are respectively slidable. The inclined passageways 509 may rotationally fix the input shaft 540 to the chuck jaws 502. The input shaft 540 may include a bore having radially inward facing threads 543 that interact with radially outward facing threads 533 of a chuck actuating screw 532.

The chuck actuating screw 532 may be supported by the input shaft 540. The interaction of the threads 533, 543 may cause the chuck actuating screw 532 to advance or retract in the axial direction relative to the input shaft 540. A rear end of the chuck actuating screw 532 may include a blind hole 531 that receives the forward end of a chuck actuating shaft 530. The chuck actuating screw 532 and the chuck actuating shaft 530 may be rotationally fixed together and the chuck actuating screw 532 may be axially moveable relative to the chuck actuating shaft 530.

The rear end of the chuck actuating shaft 530 may support the lock plate 554 and the shift plate 585. The lock plate 554 may be mounted on the chuck actuating shaft 530 so that the two component parts may be rotationally fixed together and axially moveable relative to each other. The rear surface of the lock plate 554 may include lugs 542.

The shift plate 585 may be mounted on the chuck actuating shaft 430 so that the two component parts may be rotatable, and axially moveable relative to each other. The shift plate 585 may be rotationally fixed to the housing 595. The shift plate 585 may have a front surface provided with lugs 562. When the shift plate 585 is in the axial rearward position, as shown in FIG. 15, the lugs 562 may be disengaged from the lugs 542 so that the lock plate 554 may be rotatable relative to the shift plate 585 (and thus the housing 595). And when the shift plate 585 is in the axial forward position, as shown in FIG. 16, the lugs 562 may interact with the lugs 542 so that the lock plate 554 and the shift plate 585 (and thus the housing 595) may be rotationally fixed together.

A pusher head 535 may be mounted for rotation on the forward end of the chuck actuating screw 532. A bearing 508 may be provided to facilitate the relative rotation between the pusher head 535 and the chuck actuating screw 532. The pusher head 535 may include radially oriented passageways 536 in which the chuck jaws 502 are respectively supported. The radially oriented passageways 536 may guide a radial movement of the chuck jaws 502, and at the same time may rotationally fix the chuck jaws 502 to the pusher head 535.

B. The Operation:

The tool chuck 550 may operate in the normal operating mode when the shift plate 585 is in the axial rearward position, and in the chuck actuating mode when the shift plate 585 is in the axial forward position.

During the normal operating mode, i.e., when the shift plate 585 is in the axial rearward position illustrated in FIG. 15 and when the driver is powered up, the input shaft drive gear 593 may rotationally drive the input shaft driven gear 583. Here, the lock plate 554 (and thus the chuck actuating shaft 530) may rotate together with the input shaft 540 due to the frictional engagement between the spring loaded lock plate 554 and the retainer 552. In this condition, the lock plate 554 (and thus the chuck actuating shaft 530) may rotate relative to the shift plate 585 (and thus the housing 595).

The input shaft 540 may rotate together with the chuck jaws 502, which may in turn rotationally drive the pusher head 535. The chuck actuating screw 532 and the chuck actuating shaft 530 may rotate together with the input shaft 540. Thus, the input shaft 540, the chuck jaws 502, the pusher head 535, the chuck actuating screw 532, and the chuck actuating shaft 530 may rotate together as a unit relative to the housing 595.

During the chuck actuating mode, i.e., when the shift plate 585 is in the axial forward position illustrated in FIG. 16 and when the driver is powered up, the input shaft drive gear 593 may rotationally drive the input shaft driven gear 583. The input shaft 540 may rotate together with the chuck jaws 502 and the pusher head 535. At the same time, the lugs 562 may engage with the lugs 542 to rotationally fix together the shift plate 585 and the lock plate 554. In this way, the lock plate 554 (and thus the chuck actuating shaft 530 and the chuck actuating screw 532) may be rotationally grounded to the housing 595. When in the forward axial position, the shift plate 585 may press the lock plate 554 in an axial forward direction (and against the influence of the spring 553) so that the frictional engagement between the lock plate 554 and the retainer 552 may be released.

The input shaft 540 may rotate relative to the chuck actuating screw 532, which may be rotationally locked to the housing 595. This relative rotation may cause the chuck actuating screw 532 to advance or retract in the axial direction (depending on the rotation direction of the input shaft 540) by virtue of the interaction between the radially inward facing threads 543 and the radially outward facing threads 533. The translational movement of the chuck actuating screw 532 may push or pull on the pusher head 535.

The pusher head 535 may remain rotationally fixed to the input shaft 540 (via the chuck jaws 502 being situated in the radial passageways 536 and the inclined passageways 509). Thus, the pusher head 535 may rotate relative to the chuck actuating screw 532. The translational movement of the pusher head 535 may push or pull on the chuck jaws 502, thereby opening and/or closing the same.

Figure 18:
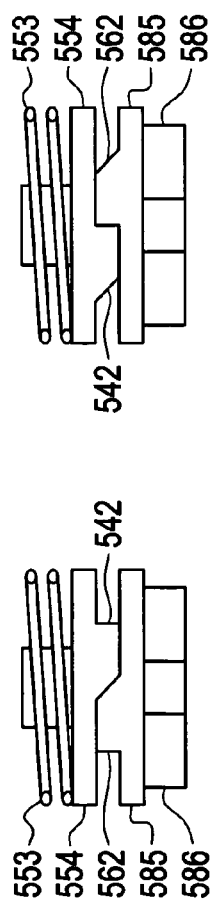
Figure 17:
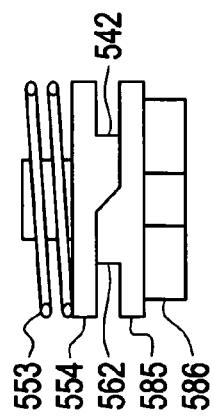

FIGS. 17 and 18 show example shapes of the interacting lugs 562, 542 respectively provided on the shift plate 585 and the lock plate 554. As shown in FIG. 17, each of the lugs 562, 542 may have an inclined face (relative to the rotational axis of the tool chuck) that may be active during the chuck actuating mode when the tool chuck is being tightened. When the tool chuck becomes tight, the inclined faces may cause the shift plate 585 and the lock plate 554 to move away from each other, thereby compressing the spring 553. Eventually, the abutting lugs 562, 542 may slip past each other, thereby causing a hammering effect. The hammering effect of the lugs 562, 542 may facilitate tightening of the tool chuck and may provide and audible indication to the user that the tool chuck is tight. It is also believed that the inclined surfaces may be so designed to provide optimum and consistent chuck tightening and thus removing end user variability from the chuck tightening process.

As shown in FIG. 18, each of the lugs 562, 542 may have a parallel face (relative to the rotational axis of the tool chuck) that may be active during the chuck actuating mode when the tool chuck is being loosened. Here, the orientation of the parallel faces may allow for more loosening torque to be applied, as compared to the tightening torque that may be applied by the inclined faces.

What is claimed is:

1. A tool chuck comprising: a shaft supporting chuck jaws, the shaft providing a first path for delivering transmission power to rotationally drive the chuck jaws, the shaft having a through hole; and a chuck actuating mechanism provided in the through hole, the chuck actuating mechanism providing a second path for delivering transmission power to open and close the chuck jaws, and wherein the chuck actuating mechanism includes a chuck actuating screw that is screw coupled to the shaft.

2. The tool chuck as set forth in claim 1, wherein the chuck actuating mechanism further includes a chuck actuating shaft that is rotationally locked to the chuck actuating screw.

3. The tool chuck as set forth in claim 2 comprising:
a pusher head mounted for rotation on the chuck actuating screw, the pusher head supporting the chuck jaws.

4. The tool chuck as set forth in claim 3, wherein the shaft, the chuck jaws and the pusher head are rotationally locked together.

5. The tool chuck as set forth in claim 1, wherein the shaft and the chuck actuating mechanism are provided at an output of a transmission.

6. The tool chuck as set forth in claim 5, wherein the transmission includes a planetary reduction system.

7. The tool chuck as set forth in claim 5, wherein no more than one of the first and the second transmission power paths is engageable with the transmission at any given instant in time.

8. The tool chuck as set forth in claim 5, wherein both of the first and the second transmission power paths are engageable with the transmission at the same time.

9. The tool chuck as set forth in claim 1, mounted on a corded power driver.

10. The tool chuck as set forth in claim 1, mounted on a cordless power driver.

11. A tool chuck comprising:
a shaft supporting chuck jaws, the shaft providing a first transmission power path for rotationally driving the chuck jaws, the shaft having a through hole; and
a chuck actuating mechanism provided in the through hole, the chuck actuating mechanism providing a second transmission power path for opening and closing the chuck jaws, the chuck actuating mechanism including
a chuck actuating screw that is screw coupled to the shaft,
a chuck actuating shaft that is rotationally locked to the chuck actuating screw,
a shift plate rotationally locked to the chuck actuating shaft, and
a chuck actuating driven gear mounted for rotation on the chuck actuating shaft;
wherein the shift plate is moveable between an axial forward position in which the shift plate engages with the shaft, and an axial rearward position in which the shift plate engages the chuck actuating driven gear.

12. A tool chuck comprising:
a shaft supporting chuck jaws, the shaft providing a first transmission power path for rotationally driving the chuck jaws, the shaft having a through hole; and
a chuck actuating mechanism provided in the through hole, the chuck actuating mechanism providing a second transmission power path for opening and closing the chuck jaws, the chuck actuating mechanism including a chuck actuating shaft that is mounted for rotation in the through hole of the shaft; and a chuck actuating screw that is screw coupled to the chuck actuating shaft.

13. The tool chuck as set forth in claim 12, wherein the chuck actuating screw includes passageways supporting the chuck jaws.

14. The tool chuck as set forth in claim 13, wherein the passageways are inclined with respect to a longitudinal axis of the shaft.

15. The tool chuck as set forth in claim 13, wherein the passageways are perpendicular to a longitudinal axis of the shaft.

16. The tool chuck as set forth in claim 12, wherein the shaft, the chuck jaws and the chuck actuating screw are rotationally locked together.

17. The tool chuck as set forth in claim 12, wherein the chuck actuating mechanism includes a chuck drive coupling that is rotationally locked to the chuck actuating shaft.

18. The tool chuck as set forth in claim 17, comprising a spring captured between the shaft and the chuck drive coupling.

19. A tool chuck comprising: a shaft supporting chuck jaws, the shaft providing a first path for delivering transmission power to the chuck jaws, the shaft having a through hole; and a chuck actuating mechanism mounted in the through hole, the chuck actuating mechanism providing a second path for delivering transmission power to open and close the chuck jaws, and wherein the chuck actuating mechanism includes a chuck actuating screw that is screw coupled to the shaft.

20. The tool chuck as set forth in claim 19, wherein the chuck actuating mechanism is not mounted on a radial outward facing surface of the shaft.

21. The tool chuck as set forth in claim 19, wherein the chuck actuating mechanism is not provided radially outward of the through hole.

22. The tool chuck as set forth in claim 19, wherein the chuck actuating mechanism is radially fixed relative to the shaft.

* * * * *